(12) United States Patent
Forsberg et al.

(10) Patent No.: US 9,792,459 B2
(45) Date of Patent: Oct. 17, 2017

(54) FLEXIBLE POLICY ARBITRATION CONTROL SUITE

(71) Applicant: SRI International, Menlo Park, CA (US)

(72) Inventors: Sean M. Forsberg, San Luis Obispo, CA (US); Scott A. Oberg, Paso Robles, CA (US); Christopher S. Lockett, Santa Clara, CA (US); Hassen Saidi, Menlo Park, CA (US); Jeffrey E. Casper, San Carlos, DE (US); Michael Deleo, Paso Robles, CA (US)

(73) Assignee: SRI INTERNATIONAL, Menlo Park, CA (US)

( * ) Notice: Subject to any disclaimer, the term of this patent is extended or adjusted under 35 U.S.C. 154(b) by 366 days.

(21) Appl. No.: 14/052,080

(22) Filed: Oct. 11, 2013

(65) Prior Publication Data
US 2014/0380405 A1    Dec. 25, 2014

Related U.S. Application Data

(60) Provisional application No. 61/839,202, filed on Jun. 25, 2013.

(51) Int. Cl.
*G06F 21/62* (2013.01)
*G06F 21/74* (2013.01)
(Continued)

(52) U.S. Cl.
CPC .............. *G06F 21/74* (2013.01); *G06F 9/542* (2013.01); *G06F 21/00* (2013.01); *G06F 21/575* (2013.01);
(Continued)

(58) Field of Classification Search
CPC . G06F 9/542; G06F 2221/2101; H04L 63/08; H04W 12/06
(Continued)

(56) References Cited

U.S. PATENT DOCUMENTS

| 7,734,933 B1 * | 6/2010 | Marek | G06F 21/57 711/173 |
| 8,519,820 B2 | 8/2013 | Cannistraro | |

(Continued)

OTHER PUBLICATIONS

SRI International, "SRI International Begins Final Development of Commercial Trusted Mobility Devices for U.S. Marine Corps," Apr. 8, 2013, 1 page, available at http://www.sri.com/newsroom/press-releases/sri-begins-final-development-commercial-trusted-mobility-devices.

(Continued)

*Primary Examiner* — Hadi Armouche
*Assistant Examiner* — Hee Song
(74) *Attorney, Agent, or Firm* — Hickman Palermo Becker Bingham LLP

(57) ABSTRACT

A policy arbitration system manages the fundamental communications and isolation between executable components and shared system resources of a computing device, and controls the use of the shared resources by the executable components. Some versions of the policy arbitration system operate on a virtualized mobile computing device to dynamically compile and implement policy rules that are issued periodically by multiple different independent execution environments that are running on the computing device. Semi-dynamic policy changes allow for context enabled policy changes that enforce the desired system and component "purpose" while simultaneously denying the "anti-purpose".

21 Claims, 11 Drawing Sheets

(51) Int. Cl.

| | |
|---|---|
| H04L 29/06 | (2006.01) |
| G06F 9/54 | (2006.01) |
| G06F 21/60 | (2013.01) |
| G06F 21/00 | (2013.01) |
| G06F 21/57 | (2013.01) |
| H04W 12/08 | (2009.01) |
| H04W 12/06 | (2009.01) |

(52) U.S. Cl.
CPC .............. *G06F 21/60* (2013.01); *H04L 63/08* (2013.01); *H04L 63/20* (2013.01); *G06F 2221/2101* (2013.01); *H04W 12/06* (2013.01); *H04W 12/08* (2013.01)

(58) Field of Classification Search
USPC ....................................... 726/1, 22
See application file for complete search history.

(56) References Cited

U.S. PATENT DOCUMENTS

| | | | | |
|---|---|---|---|---|
| 8,931,042 | B1* | 1/2015 | Weiss | G06F 15/16 726/1 |
| 9,075,955 | B2* | 7/2015 | Schieman | G06F 21/53 |
| 2009/0271844 | A1* | 10/2009 | Zhang | G06F 12/1458 726/2 |
| 2013/0055378 | A1* | 2/2013 | Chang | G06F 21/53 726/17 |
| 2013/0152092 | A1 | 6/2013 | Yadgar | |
| 2013/0227641 | A1* | 8/2013 | White | H04L 63/20 726/1 |
| 2013/0263206 | A1* | 10/2013 | Nefedov | G06F 21/6218 726/1 |
| 2014/0157351 | A1* | 6/2014 | Canning | H04L 63/10 726/1 |
| 2014/0280952 | A1* | 9/2014 | Shear | H04L 47/70 709/226 |
| 2014/0330990 | A1* | 11/2014 | Lang | G06F 9/4555 710/14 |

OTHER PUBLICATIONS

Carl L. Nerup et al., "A High Assurance Framework for Mobile/Wireless Device Applications," 2012, 15 pages, available at http://www.ok-labs.com/_assets/OK-WP-High-Assurance-Framework-022712.pdf.

Rob McCammon, "SecureIT Mobile: How to Build a More Secure Smartphone with Mobile Virtualization and Other Commercial Off-the-Shelf Technology," 2010, 14 pages.

Grit Denker et al., "Policy-Based Date Downgrading: Toward a Semantic Framework and Automated Tools to Balance Need-To-Protect and Need-To-Share Policies," IEEE International Symposium on Policies for Distributed Systems and Networks, Jun. 17, 2010. 9 pages.

Common Criteria for Information Tehcnology Security Evaluation, "Part 1: Introduction and General Model," v. 3.1, rev. 3, Jul. 2009, 93 pages, available at http://www.commoncriterialportal.org/files/ccfiles/CCPART1V3.1R3.pdf.

Common Criteria for Information Tehcnology Security Evaluation, "Part 2: Security Functional Components," v. 3.1, rev. 3, Jul. 2009, 321 pages, available at http://www.commoncriterialportal.org/files/ccfiles/CCPART2V3.1R3.pdf.

Common Criteria for Information Tehcnology Security Evaluation, "Part 3: Security Assurance Components," v. 3.1, rev. 3, Jul. 2009, 232 pages, available at http://www.commoncriterialportal.org/files/ccfiles/CCPART3V3.1R3.pdf.

J. M. Rushby et al., The MILS Component Integration Approach to Secure Information Sharing, Proceedings of the 27th IEEE/AIAA Digital Avionics Systems Conference, 2008, 12 pages, St. Paul, MN, USA.

National Information Assurance Partnership: Common Criteria Evaluation & Validation Scheme, "U.S. Government Protection Profile for Separation Kernels in Environments Requiring High Robustness," v. 1.03, Jun. 29, 2007, 182 pages, available at http://www.niap-ccevs.org/pp/pp_skpp_hr_v1.03.pdf.

Rance Delong et al., "Toward a Medium-Robustness Separation Kernel Protection Profile," 2007, 10 pages available at http://www.acsac.org/2007/papers/168.pdf.

Jonathon Corbet, "dm-verity", Rhino Security Labs, 2011, 4 pages.

Dmitry Kasatkin, "[dm-devel] [PATCH 0/1] dm-integrity: Integrity Protection Device-Mapper Target", http://www.redhat.com/archives/dm-devel/2012-September/msg00320.html, 2 pages.

TrustZone, ARM The Architecture for the Digital World; http://www.arm.com/products/processors/technologies/trustzone.php, 5 pages, 2015.

Trustonic; Trusted Execution Environment, http://www.trustonic.com/products-services/trusted-execution-environment, 1 page, 2015.

Open Kernel Labs, OKL4 Microviser : Open Kernel Labs, http://www.ok-labs.com/products/okl4-microvisor, 4 pages.

Christopher S. Lockett et al., unpublished U.S. Appl. No. 14/052,266, filed Oct. 11, 2013, 140 pages.

Hassen Saidi et al., unpublished U.S. Appl. No. 14/052,169, filed Oct. 11, 2013, 55 pages.

Sean M. Forsberg et al., unpublished U.S. Appl. No. 14/052,080, filed Oct. 11, 2013, 69 pages.

Scott A. Oberg et al., unpublished U.S. Appl. No. 14/051,923, filed Oct. 11, 2013, 70 pages.

Scott A. Oberg et al., unpublished U.S. Appl. No. 13/872,865, filed Apr. 29, 2013, 49 pages.

Kenneth C. Nitz et al., unpublished U.S. Appl. No. 13/585,003, filed Aug. 14, 2012, 63 pages.

Kenneth C. Nitz et al., unpublished U.S. Appl. No. 13/585,008, filed on Aug. 14, 2012, 63 pages.

Edgar T. Kalns et al., unpublished U.S. Appl. No. 13/891,858, filed May 10, 2013, 67 pages.

Edgar T. Kalns et al., unpublished U.S. Appl. No. 13/891,864, filed May 10, 2013, 65 pages.

Unpublished U.S. Appl. No. 61/839,202, filed Jun. 25, 2013, 63 pages.

Redbend Software, A New Solution for Managing Embedded Handset Software, printed May 7, 2013, 6 pages.

GlobalPlatform made simple guide: Trusted Execution Environment (TEE) Guide, available at http://www.globalplatform.org/mediaguidetee.asp, printed Aug. 16, 2013, 4 pages.

* cited by examiner

FLEXIBLE POLICY ARBITRATION CONTROL SUITE

CROSS-REFERENCES TO RELATED APPLICATIONS

This application claims the benefit of and priority to U.S. Provisional Patent Application Ser. No. 61/839,202, filed Jun. 25, 2013, which is incorporated herein by this reference in its entirety.

This application is related to U.S. Utility application Ser. No. 13/872,865 filed Apr. 29, 2013, of Oberg et al., titled "Operating System Independent Integrity Verification," which is incorporated herein by this reference in its entirety.

This application is related to U.S. Utility application Ser. No. 14/051,923 filed on even date herewith, of Oberg et al., titled "Componentized Provisioning," which is incorporated herein by this reference in its entirety.

This application is related to U.S. Utility application Ser. No. 14/025,169 now U.s. Pat. No. 9,495,560 filed on even date herewith, of Saidi et al., titled "Polymorphic Virtual Appliance Rule Set," which is incorporated herein by this reference in its entirety.

This application is related to U.S. Utility application Ser. No. 14/052,266, now U.S. Pat. No. 9,501,666 filed on even date herewith, of Lockett et al., titled "Polymorphic Computing Architectures," which is incorporated herein by this reference in its entirety.

GOVERNMENT RIGHTS

This invention was made in part with government support under contract number M67854-12-C-2408, awarded by the United States Marine Corps Systems Command. The United States Government has certain rights in this invention.

BACKGROUND

Traditional system architectures for computing platforms, and mobile systems in particular (such as smart phones, tablet computers, wearable devices, and others), have a monolithic, vertical design in which execution of applications stored on the file system, device drivers, and software stacks, is controlled by the operating system kernel. A consequence of traditional system architectures is the co-location of the software into a single environment, resulting in several million lines of software code for a single system. A direct result is a highly complicated, co-mingled architecture in which it is extremely difficult to identify, mitigate and correct vulnerabilities. A security issue raised by a software application running on the device can therefore impact the entire system. As a consequence, it can be challenging to reliably and consistently maintain the security of the execution environment in these traditional, overly complex systems.

The potential security risks posed by the large "attack surface" (e.g., the code within a computer system that can be run by unauthenticated users) of certain architectures (such as ANDROID) and by the downloading of third-party software are well-documented. The risks are even more pronounced when a computing device is used for multiple different, potentially conflicting purposes. Such may be the case in the "bring your own device" (BYOD) context in which computing devices, and more particularly, mobile computing devices, are used for both business and personal matters. These and other issues have spawned a "mobile device management" (MDM) industry.

Virtualization technology has long been a component of data center and desktop computing. Efforts are being made to apply virtualization technology to mobile devices. Proponents of mobile device virtualization believe that the technology can accelerate the development and deployment of new mobile device software at a lower cost. However, security risks exist whether a traditional monolithic or virtualized architecture is used.

BRIEF DESCRIPTION OF THE DRAWINGS

This disclosure is illustrated by way of example and not by way of limitation in the accompanying figures. The figures may, alone or in combination, illustrate one or more embodiments of the disclosure. Elements illustrated in the figures are not necessarily drawn to scale. Reference labels may be repeated among the figures to indicate corresponding or analogous elements.

DETAILED DESCRIPTION OF THE DRAWINGS

Figure 1:
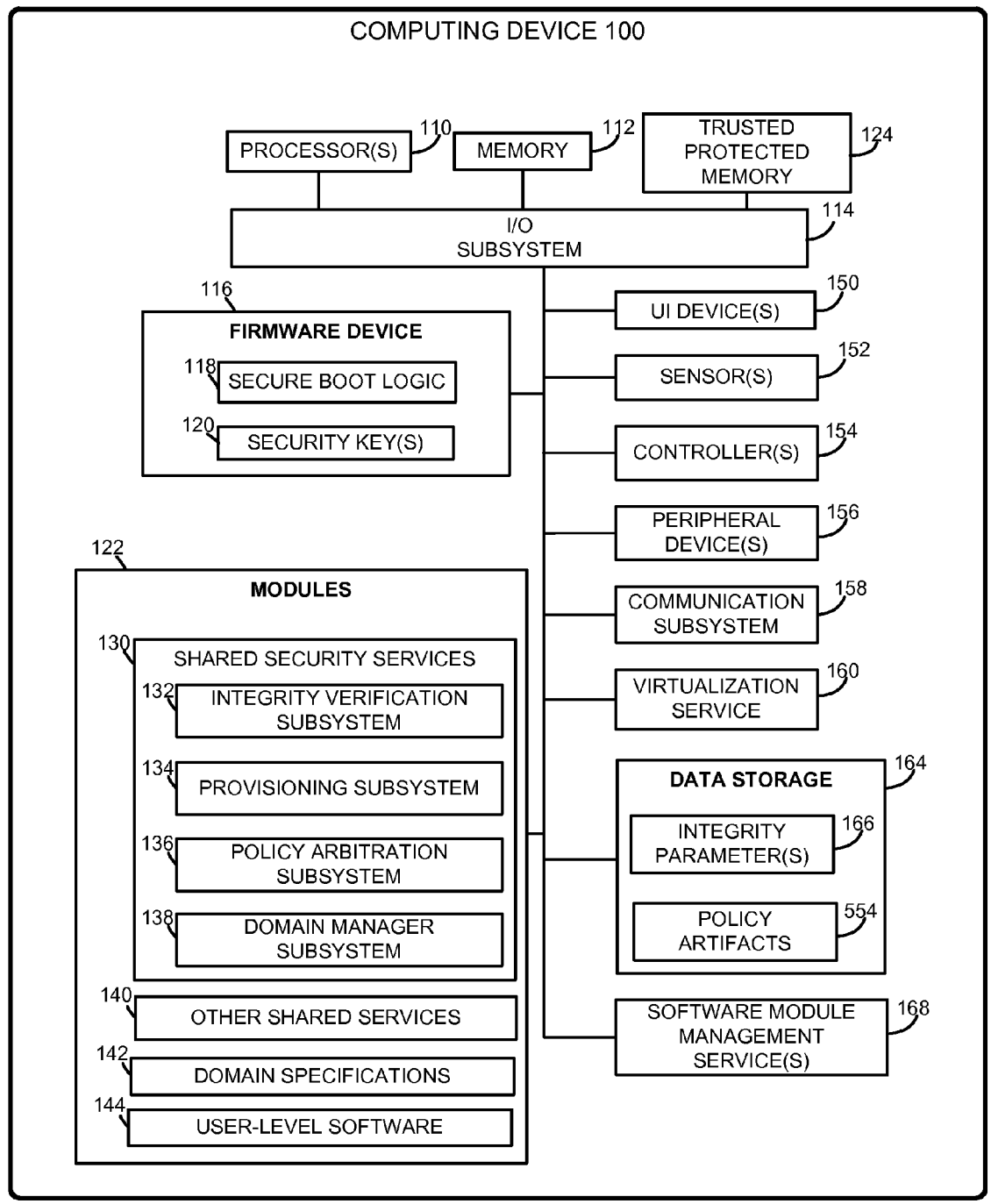
FIG. 1 is a simplified block diagram of at least one embodiment of a system architecture for a computing device, including a policy arbitration subsystem as disclosed herein.

While the concepts of the present disclosure are susceptible to various modifications and alternative forms, specific embodiments thereof are shown by way of example in the drawings and are described in detail below. It should be understood that there is no intent to limit the concepts of the present disclosure to the particular forms disclosed. On the contrary, the intent is to cover all modifications, equivalents, and alternatives consistent with the present disclosure and the appended claims.

Existing mobile device management ("MDM") and other policy solutions implement static, monolithic security policies that are designed for the traditional architectures. As a result, these solutions are unable to dynamically control the use and sharing of the device's system resources, e.g., based on the current purpose of the device. For example, traditional policy solutions are unable to detect whether, in a given circumstance, a device is being used for a specific purpose, such as a personal matter or a business-related transaction. As such, these solutions result in inflexible and often over-restrictive policy as the lack of context means they must always enact the most protective measures. While the overly protective policy measures achieve the "need to protect" requirements, they simultaneously fail to achieve the "need to share" requirements.

MILS (Multiple Independent Levels of Security) concepts can be applied to these and other computing environments to provide a modular, component-based approach to secure system architectures, policy arbitration and enforcement, and system certification. In general, a MILS-based platform is comprised of components that share physical resources while creating strongly separated exported resources. When composed "additively," these resources form a distributed resource sharing substrate, which may be referred to as a MILS platform. In high assurance applications, the use of a separation kernel is a component of the MILS platform. The separation kernel architecture provides for a functionally "distrusted" system of individual, separated components with well defined, limited communication channels between the components ("distrusted" in the sense that the individual components are not assumed to be trusted from a security standpoint). As used herein, a "well-defined" communication channel may refer to, among other things, one or more signal paths, which can be implemented in hardware or software, and may be implemented as a logical interface between two logical (e.g., virtualized) units, where the interface is clearly defined so that the entities on either end of the communication channel or channel are known and unchangeable, and the type of communications that are permitted to be sent over the communication channel/channel are also known and unchangeable. Once each of these well-defined communication channels or channels has been validated as such, it need not be continuously re-validated.

As disclosed herein, a flexible, distributed policy architecture can be realized, for example, upon a MILS-based platform. Such a policy architecture can be realized by operational components of the architecture to achieve a particular system purpose. In the abstract, the policy architecture defines components (e.g., subjects/objects/domains/applications) and interactions between the components. Isolation and information flow control policies govern the existence of the architectural components on the platform and their interactions with system resources and other components. Isolation policies provide that only controlled, well-defined interfaces (thus limiting the type and scope of interaction) are allowed for direct interaction between components. Furthermore, the data allowed to pass through these interfaces can be controlled by the "trusted" side of the connection or by a "trusted" component inline of the connection. Information flow control policies define explicitly permitted causality or interference between the components. Whereas current mobility policy and MDM solutions are only as secure as their parent process, the disclosed approach can provide a peer-based architecture in which peer components (such as those found in a virtualized system) are isolated from one another so as to be protected from other peer components should any of the components be compromised. Among other things, a peer-based policy architecture as disclosed herein enables individual components' policies to exist without prior or current knowledge of other individual component policies.

In some embodiments, the disclosed policy arbitration subsystem can be employed to provide a high assurance of security for "multiple-personality" computing devices. In such devices, different user-level execution environments (e.g., personal and enterprise domains, or "unclassified" and "classified" domains) may be isolated from one another using the MILS-based techniques, so as to, for example, simultaneously protect personal privacy and enterprise security (e.g., the "need to protect") while also enabling appropriate data sharing (e.g.; the "need to share"). For instance, one domain may allow a mobile device user to access personal records such as e-mail, medical data, or financial reports, but deny access to other domains, while another domain may permit access to data and applications involving very highly confidential or secret business information, processes or operations, but deny such access to other domains. To do this, embodiments of the policy arbitration subsystem may cooperate with domain isolation, encryption, policy, and other related security technologies developed by SRI International, which can be embedded into smart phones and other mobile platforms, as described in more detail below and in other patent applications of SRI International, including the related patent applications identified above. Some examples of high assurance, multiple-personality mobile devices that have been developed by SRI International were mentioned in the press release, "SRI International Begins Final Development of Commercial Trusted Mobility Devices for U.S. Marine Corps," Apr. 8, 2013 (http://www.sri.com/newsroom/press-releases/sri-begins-finaldevelopment-commercial-trusted-mobility-devices).

Referring now to FIG. 1, an illustrative computing device 100 is embodied as a mobile computing device configured with a modular, virtualized system architecture, as described in more detail below. It should be understood, however, that the computing device 100 may be any type of computing device or platform, e.g., a device that has a virtualized architecture, a traditional system architecture, or a traditional system architecture configured to provide some virtualization features. For example, the computing device 100 may be embodied as any type of personal computer (e.g., desktop, laptop, net book, e-reader, tablet, smart phone, body-mounted device, or mobile appliance), a server, server farms hosted in the cloud, an enterprise computer system, a network of computers, the network infrastructure itself, a combination of computers and other electronic devices, or other types of electronic device, including wearable computing devices, smart appliances, medical monitoring and sensing devices, commercial personal devices, health monitoring devices, embedded scientific and sensing devices, UAV's (unmanned aerial vehicles), SUAV's (small unmanned air vehicles), other types of unmanned vehicles, and other safety critical systems.

In some embodiments, the disclosed approach extends the purpose/anti-purpose concepts discussed in Denker et al., "Policy-Based Downgrading: Toward a Semantic Framework and Automated Tools to Balance Need-to-Protect and Need-to-Share Policies" (IEEE International Symposium on Policies for Distributed Systems and Networks, 2010) to a MILS-enabled semi-dynamic policy arbitration subsystem. For instance, MILS-based components and policies that are only designed to achieve a particular "purpose" (or desired function) may in some contexts result in realizing an "anti-purpose" of the system (an unintended consequence). As an example, a GPS (Global Positioning System) location of an asset may need to be shared with others to achieve a defined "purpose," but in doing so, the degree of granularity of the shared location information may violate a security policy "anti-purpose"—e.g., "I would like certain trusted people to know when I am at home . . . but they do not need to know exactly where I am in my home."

Some embodiments of the disclosed policy arbitration subsystem are embodied in a context-aware device (e.g., a mobile device equipped with one or more "environment" sensors, such as a GPS, accelerometer, and/or others). Such embodiments can extend a MILS-based policy architecture by enabling semi-dynamic policy implementations in the context-aware device. For example, the policy arbitration subsystem can manage and enforce the embedded policies of isolated, distributed architectural components that are designed for specific purposes. Such policies may be statically pre-defined, e.g., as information flow control channels between isolated MILS-based components. As used herein, "policy" may refer to, among other things, an expression of enforcement, monitoring, and/or other capabilities that are needed on the computing device to ensure that the computing device or a component thereof operates according to a defined purpose and does not perform the associated anti-purpose. For example, a policy may define criteria for sharing and/or protecting information and components of the computing device under various conditions and contexts. The policy may be implemented, for example, as a set of rules, instructions, data values, parameters, or a combination thereof, which may be stored in, for example, a database or table.

In some embodiments, one or more security keys 120 used by the secure boot logic 118 and/or other modules 122 may be stored in the firmware device 116. The security keys 120 may include, for example, one or more public keys used in a digital signature scheme, which may be employed to authenticate one or more integrity parameters 166. The integrity parameters 166 may include trusted block device hashes, which may be computed at initial installation of a software module 122 by a trusted party. The integrity parameters 166 may also include current block device hashes that are computed during use of the computing device 100, e.g., at software load time. More generally, the integrity parameters 166 can include or reference information (such as hash values) that can be evaluated by the secure boot logic 118 and/or other modules 122 to check the integrity of executable components of the computing device 100 (including, but not limited to, the policy arbitration subsystem 136) at load time or at run time. The integrity parameters 166 and the use thereof by the computing device 100 are described in more detail in Oberg et al., U.S. patent application Ser. No. 13/872,865.

The disclosed policy arbitration subsystem may be embodied as a suite of software components, such as API (Application Programming Interface) extensions. However, some embodiments of the policy arbitration suite extend beyond software-only implementations. For example, some embodiments enable policy-based controls in systems that are designed with advanced materials in which physical properties are modified in specific contexts, such as temperature, radio frequency (RF) fields, electro-magnetic fields, and/or others. In some instances, the physical properties themselves may be a realization of a physics-based embedded policy designed for a specific purpose. Where an "anti-purpose" would otherwise result, embodiments of the policy arbitration subsystem may deny access by the component to selected parts of the system. For example, component-based power control can in itself be a realization of the MILS-based "isolation" policy. As such, powering down a GPS or radio receiver is one form of isolation. Thus, in some cases, the disclosed policy arbitration subsystem can be used to implement low level resource management (e.g., device management that extends beyond the software/application layer to hardware/firmware layers) and other similar concepts, where low-level control of system components can achieve a desired "purpose" and deny the "anti-purpose."

The illustrative computing device 100 includes at least one central processing unit or processor 110 (e.g., a microprocessor, microcontroller, digital signal processor, etc.), memory 112, trusted protected memory 124, and an input/output (I/O) subsystem 114. For example, in some embodiments, the processor(s) 110 include separate baseband and applications processors. In these embodiments, features of the baseband processor and the applications processor may be located on the same or different hardware devices (e.g., a common substrate). In general, the baseband processor interfaces with other components of the device/platform 100 and/or external components to provide, among other things, wireless communication services, such as cellular, BLUETOOTH, WLAN, and/or other services. In general, the applications processor handles processing required by software and firmware applications running on the computing device/platform 100, as well as interfacing with various sensors and/or other system resources 210. However, it should be understood that features typically handled by the baseband processor may be handled by the applications processor and vice versa, in some embodiments.

The processor(s) 110 and the I/O subsystem 114 are communicatively coupled to the memory 112 and the trusted protected memory 124. The memory 112 and the trusted protected memory 124 may be embodied as any type of suitable computer memory device (e.g., volatile memory such as various forms of random access memory). More specifically, the trusted protected memory 124 is configured to provide component isolation in accordance with the MILS-based techniques, as described in more detail below with reference to FIG. 3.

The I/O subsystem 114 may include, among other things, an I/O controller, a memory controller, and one or more I/O ports. In some embodiments, the I/O subsystem 114 may form a portion of a system-on-a-chip (SoC) and be incorporated, along with the processor 110 and other components of the computing device 100, on a single integrated circuit chip. As such, each or any of the components coupled to the I/O subsystem 114 may be located on a common integrated circuit chip, in some embodiments.

The illustrative I/O subsystem 114 is communicatively coupled to a number of hardware, firmware, and software components, including a firmware device 116, a number of executable modules 122, a number of user interface devices 150 (e.g., a touchscreen, keyboard, virtual keypad, microphone, etc.), one or more sensors 152 (e.g., optical sensors, motion sensors, location sensors, global positioning system (GPS) receivers, digital cameras, and the like), controllers 154 (e.g., memory controllers, I/O controllers, network interface controllers, graphics controllers, etc.), other peripheral devices 156 (e.g., cameras, audio recorders, modems, data storage interfaces, displays, speakers, and other peripheral devices), the communication subsystem 158, a virtualization service 160, one or more data storage devices 164, and one or more software module management services 168.

The illustrative firmware device 116 is embodied as a persistent storage device such as a non-volatile or read-only memory device (e.g., NAND or NOR flash memory). In the illustrative embodiments, the firmware device 116 stores secure boot logic 118. The secure boot logic 118 includes the set of computer routines commonly known as, for example, the bootloader, Unified Extensible Firmware Interface (UEFI), or Basic Input/Output System (BIOS). The secure boot logic 118 enables the computing device 100 to start its operation once electrical power to the device is switched on, or to restart its operation in response to a user command. In some embodiments (e.g., traditional system architectures), the secure boot logic 118 loads and starts an operating system and communicates with the various other components and devices that are coupled to the I/O subsystem 114. In the illustrative virtualized mobile device architecture, however, the secure boot logic 118 loads and starts the virtualization service 160 directly from the firmware device 116, without or prior to launching any operating systems.

In the illustrative computing platform depicted by FIG. 1, the modules 122 include shared, modular security services 130 and other shared, modular services 140 that, together with the virtualization service 160, form a trusted computing base (TCB). The shared security services 130 illustratively include an integrity verification subsystem 132, a provisioning subsystem 134, the policy arbitration subsystem 136, and a domain manager subsystem 138. The shared security services 130 are described in more detail below with reference to FIG. 2. The other shared services 140 include system-level services, such as device drivers, which are, in more traditional system architectures, typically provided by the operating system kernel. As used herein, "shared service" may refer to a firmware or software-based executable module that allows operating systems and other executable applications and processes to interface with the shared system resources of the computing device 100, which may include, for example, physical or hardware resources such as one or more of the processors 110, memory 112, memory 124, I/O subsystem 114, and/or any of the devices and components that are coupled to the I/O subsystem 114, whether such components are coupled directly (e.g., via bus) or over a network.

In the illustrative platform 100, the shared services 140 are virtualized at the module level, so that in a given virtualized execution environment of the computing device 100, the shared services 140 each map to a corresponding system resource. For example, some of the shared services 140 may be embodied as device drivers that each map to a physical device driver for a different hardware component of the computing device 100. By modularizing and isolating the shared services 140 independently of any particular component or domain, access to the shared resources of the computing device 100 can be monitored, controlled and restricted at the module level. In general, the modules 122 are illustrated as such for discussion purposes, and such illustration is not intended to imply that any specific implementation details are required. For example, any of the modules 122 may be combined or divided into submodules, subprocesses, or other units of computer code or data as may be required by a particular design or implementation of the computing device 100.

Domains

In FIG. 1, the domain specifications 142 represent runtime specifications for individual, specially partitioned execution environments that can be executed by the virtualization service 160 during operation of the computing device 100. As used herein, "domain" may be used to refer to, among other things, a machine-executable unit that can request access to one or more system resources, where such accesses can be controlled by the policy arbitration subsystem 136. For example, some domains may be embodied as very small, specialized functional units. Each of the individual security services 250 and/or shared services 220 (FIG. 2) may be embodied as domains, in some cases. Other domains may be embodied as "user domains" through which a person, such as an end user, may interact with the computing device 100. The domains 260, 270 (FIG. 2) are examples of user domains, as explained further below.

The domain specifications 142 for each domain specify one or more executable modules that are permitted to execute in the domain to request access to one or more shared system resources. For example, the domain specifications 142 for each user domain may specify user-level software 144 that is permitted to execute in the user domain. The user-level software 144 includes, for example, an operating system and one or more user-level software applications. Thus, with respect to the domain specifications 142, the term "modules 122" may refer to module or modules (e.g., the user-level software 144) that is associated with the domain specification 142 rather than the specification itself. Each domain specification 142 may define a different "purpose" or "personality" of the computing device 100, as may be needed or desired, depending on the particular design, purpose, or usage context of the computing device 100.

To address these issues, in some embodiments, the disclosed policy arbitration subsystem manages the policies of all executable components of the computing device, such that the individual components can operate without a priori knowledge of other components' policies. In doing so, embodiments of the disclosed policy arbitration subsystem can manage each domain's policy without changing or adversely affecting the enforcement of the policies of other domains. As a result, each domain's "purpose" can be enabled while the "anti-purpose" is reliably denied. Moreover, some embodiments have the flexibility to enable the purpose and deny the anti-purpose in specific contexts detected by a context aware platform, using a semi-dynamic policy arbitration suite as described in more detail below. In these and other ways, it can be said that aspects of the disclosed policy arbitration subsystem can independently control the behavior and activities of specific components of a device without managing the entire device.

Figure 6:
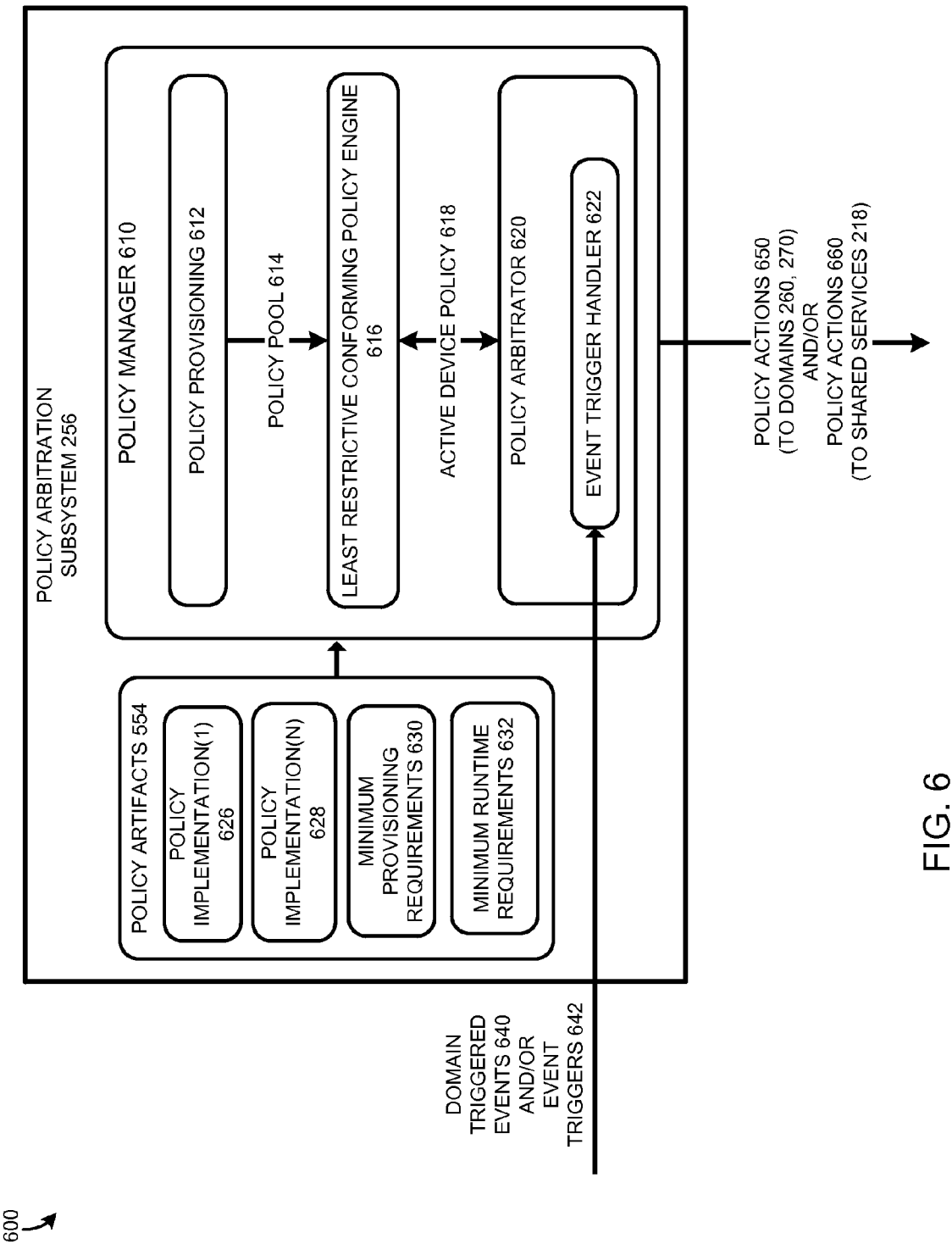
FIG. 6 is a simplified module diagram of at least one embodiment of a policy arbitration subsystem as disclosed herein.

Referring to FIG. 6, a policy manager 610 of the disclosed policy arbitration subsystem 136, 256 is also charged with executing and enforcing all of the disparate policies of all of the existing domains that are provisioned on the device during operation and use of the device. To do this, in some embodiments, the policy arbitration subsystem 136, 256 or more particularly the policy arbitrator 620 acts as a supervisory or higher-privileged authority with respect to the domains, and the policy arbitration subsystem 136, 256 assumes that all of the domains that are provisioned on the device are peers to one another. In other words, no domain's policy has a higher priority than any other domain's policy from the standpoint of the policy arbitration subsystem 136, 256, and it is the policy arbitration subsystem 136, 256's job to ensure that the domain-specific policies are properly reconciled and collectively enforced on the device.

In some embodiments, policy artifacts 554, discussed below, are only known to the issuing domain and the policy arbitration subsystem 136, 256. That is, using the isolation strategies described herein, the domain-specific policies can be kept confidential from other domains. In some cases, the submission of a policy artifact 554 by a domain 260, 270 to the policy arbitration subsystem 256 and the acceptance of the submitted policy by the policy arbitration subsystem 256 creates a form of a "social contract" or mutual agreement between the domain 260, 270 (and the corresponding set of respective stakeholders that created the policy artifact) and the policy arbitration subsystem 136, 256 that, in exchange for the assurance provided by the policy arbitration subsystem 136, 256 that the domain's policy will be reliably enforced in all relevant contexts, the domain 260, 270 cedes control of the enforcement of its policy to the policy arbitration subsystem 136, 256.

As described in more detail below, the policy arbitration subsystem 136, 256 can adapt or extend "static" domain policies to a multiple-domain environment in which different domains 260, 270 execute independently of one another and execute independently of the policy arbitration subsystem 136, 256. In some cases, the domains 260, 270 may be configured and provisioned by different entities or "stakeholders" (e.g., outside agents such as application service providers or third-party MDM providers). As such, or for other reasons, each of the domains 260, 270 may have its own policy or set of policies that are applicable only to that particular domain and not to other domains. Thus, in many cases, each of the domains 260, 270 may be internally unaware of the policies of the other domains 260, 270 and may even be unaware of other domains 260, 270 that exist on the computing device 100. Accordingly, the policy arbitration subsystem 256 acts as a mediator in that it resolves conflicts between domain-specific policies at the "global" device level, and controls access to the system resources 210 by the domains in accordance with the domain-specific policies as reconciled at the global, device level.

Isolation

Figure 2:
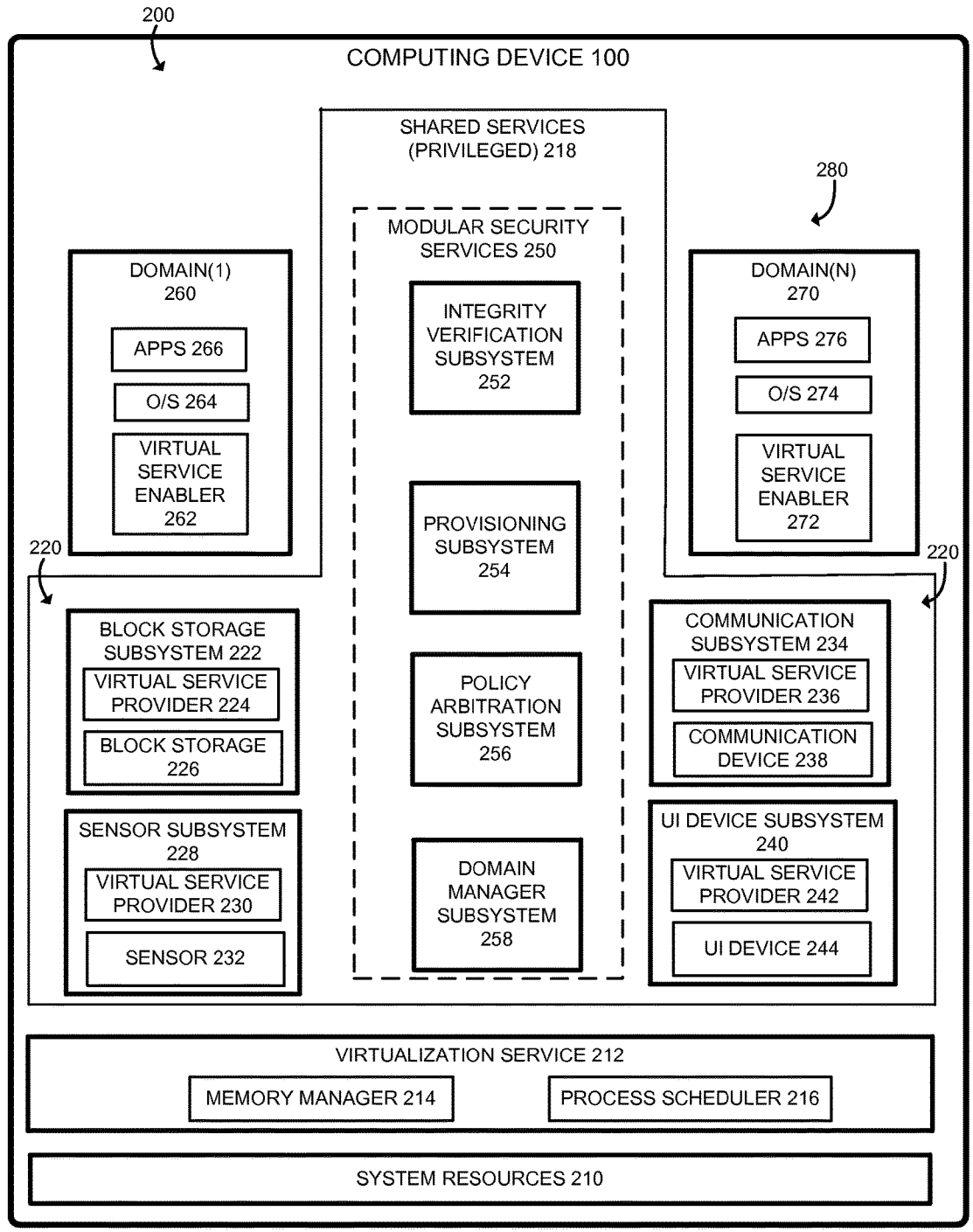
FIG. 2 is a simplified module diagram of at least one embodiment of a virtualized execution environment of the computing device of FIG. 1.

In the illustration of FIG. 2, the other shared services 220 include executing instances of a block storage subsystem 222, a sensor subsystem 228, a communication subsystem 234, and a user interface device subsystem 240. Other system services, such as audit services, encryption services, and/or many others, may be similarly modularized and virtualized, although not specifically shown. The illustrative shared services 218 are both memory-isolated and process-isolated from the domains (which, as illustrated, include at least a domain(1) 260 and a domain(N) 270). Additionally, the domains 260, 270 are both memory-isolated and process-isolated from each other and from the executing instances of the components 212, 218 of the trusted computing base. As such, the illustrative domains 260, 270 are independently executable and independently controllable by the trusted computing base 212, 218 or more specifically, by the virtualization service 212 interacting with the share security services 250 and with the other shared services 220. While only two domains are shown in the illustration, it should be understood that the computing device 100 may support any number ("N") of domains 260, 270 according to the requirements of a particular design of the computing device 100.

Virtualization

The illustrative virtualization service 160 is embodied as a type of hypervisor or separation kernel system (e.g., with paravirtualized guest operating systems or with hardware-based virtualization extensions), which is launched by the secure boot logic 118 directly from the firmware 116 rather than by another operating system. For example, the virtualization service 160 may be embodied as a "thin" hypervisor, which may refer to a type of hypervisor that is designed to be "small," in the sense that only the core functions that are needed to establish virtualization on the computing device 100 are included in the hypervisor. For example, in the illustrative embodiment, many if not all of the shared services 130, 140 are not built into the hypervisor but operate at a level of abstraction above the hypervisor (e.g., as "middleware"). In some embodiments, some components of the shared services 130, 140 are built into the hypervisor (e.g., communication channels which allow the "secure" connection between two components/modules/domains).

In some embodiments, however, the virtualization service 160 may include a more traditional hypervisor, virtual machine manager (VMM), or similar virtualization platform. In some embodiments, the virtualization service 160 may be embodied as a "bare metal" hypervisor, which can execute directly from the system hardware (e.g., by a processor 110 rather than the secure boot logic 118 or an operating system).

In general, the virtualization service 160 is embodied as a privileged software component that facilitates and manages the virtualization of the shared resources of the computing device 100. In some embodiments, portions of the virtualization service 160 may be firmware-based rather than software-based. The virtualization service 160 allows the domains 260, 270 (FIG. 2) defined by the domain specifications 142 to execute concurrently or serially on the computing device 100 in isolated, virtualized execution environments. To increase the strength of the social contract, or for other reasons, some embodiments may utilize a priority-based schedule to ensure that triggers and other event-based policy control subsystems are processed first and/or exclusively, e.g., to reduce (or eliminate) any security vulnerability during the small gap between an event triggering and the resulting action to be performed.

As mentioned above, in the illustrative embodiments, the virtualization service 160 is launched directly by the secure boot logic 118 rather than by an operating system. In other embodiments (e.g., traditional system architectures), the virtualization service 160 may be launched by an operating system or by system hardware (e.g., a processor 110). In any case, the virtualization service 160 executes in a higher-privileged system mode of the computing device 100, as opposed to a lesser-privileged mode. As such, in operation, the virtualization service 160 may have substantially full control of the system resources of the computing device 100. Further, the other components of the trusted computing base (e.g., the shared security services 130 and the other shared services 140) may, when called upon by the virtualization service 160, also have substantially full control of one or more of the system resources of the computing device 100 with which they are designed to communicate. That is, due to their modularity, the shared services 130, 140 may each be capable of controlling only a specific resource or a specific feature of a resource of the computing device 100, in some embodiments. In some embodiments, the modularized control of the system resources by the trusted computing base 130, 140, 160 is aided by the use of well-defined communication channels, as described herein.

Referring now to FIG. 2, an embodiment of a modular, virtualized execution environment 200 that may be established on the computing device 100 is shown. At runtime, an executing instance of the virtualization service 212 interfaces with the system resources 210 (e.g., processor(s) 110, memory 112, I/O subsystem 114, and/or devices 116, 150, 152, 154, 156, 158, 164) through one or more submodules or subprocesses referred to herein as a memory manager 214 and a process scheduler 216 (which are also part of the trusted computing base). The memory manager 214 allocates virtual memory to each of the executing instances of the domains 260, 270 and shared services 218 that corresponds to their respective assigned physical memory (e.g., trusted protected memory 124), so as to implement and maintain the memory isolation technology described herein. The individual instances of the domains 260, 270 and shared services 218, and/or individual executing components thereof, may be referred to herein as "components" 280 for ease of discussion. The process scheduler 216 schedules and regulates communications between the components 280 and the virtualization service 212 over the well-defined communication channels as described herein, so as to implement and maintain the process isolation technology described herein.

Figure 3:
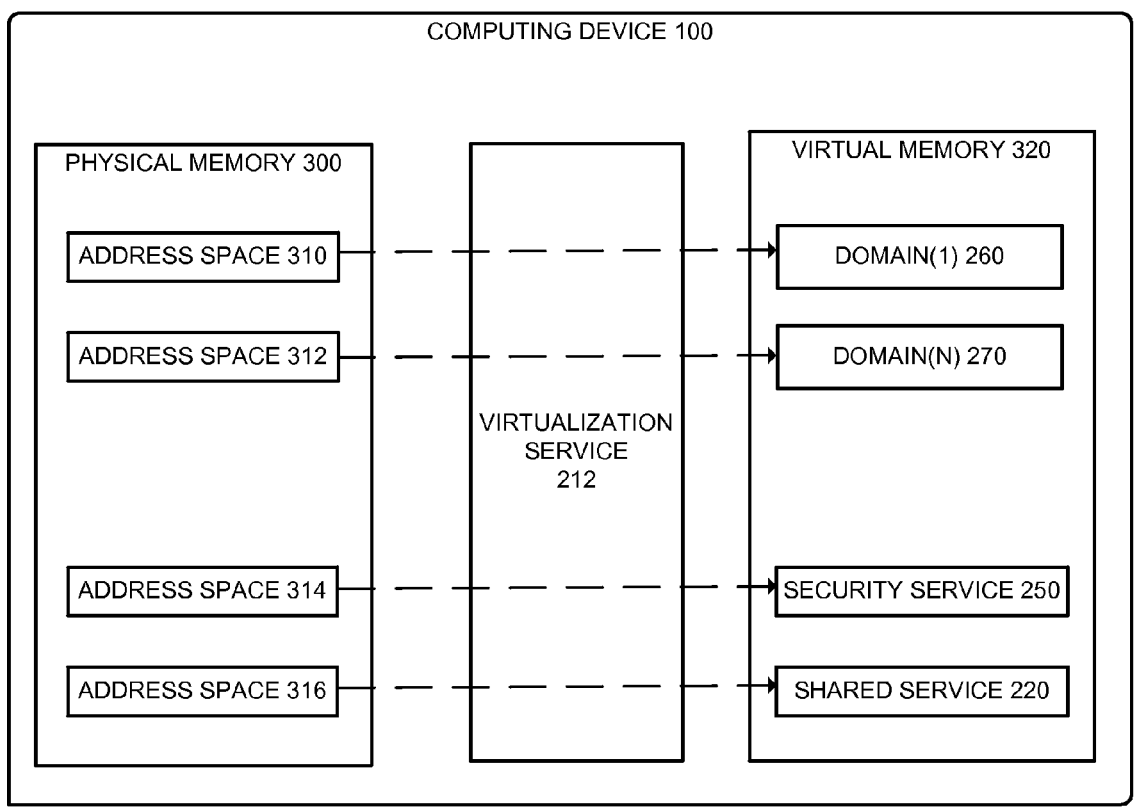
FIG. 3 is a simplified block diagram of a portion of the virtualized execution environment of FIG. 2, illustrating at least one embodiment of a memory isolation scheme as disclosed herein.

Referring now to FIG. 3, an embodiment of the memory isolation features of the illustrative platform 100 is shown. The computing device 100 includes physical memory 300 (e.g., trusted protected memory 124) which is abstracted to virtual memory 320 by the virtualization service 160. The physical memory 300 includes a number of physical address spaces 310, 312, 314, 316. When the physical memory resources are virtualized by the virtualization service 212 (in conjunction with a modular shared service 220, in some embodiments), the components 280 are each mapped to separate, isolated portions of the physical memory 300. The assignment of physical memory address spaces to components 280 (e.g., shared services 220, security services 250, domains 260, 270) and the assignment of security labels to memory addresses may be performed at the time that the computing device 100 is created and provisioned (e.g., by an original equipment manufacturer, OEM, or dynamically created, e.g., via a Trusted Platform Module (TPM)), for example. In some embodiments, unique security labels may be associated with each of the memory addresses to facilitate the security features provided by the security services 250. For example, the policy arbitration subsystem 256 may use such security labels to determine whether to permit a domain 260, 270 to perform a read or write memory access to a portion of the physical memory 300.

Figure 4:
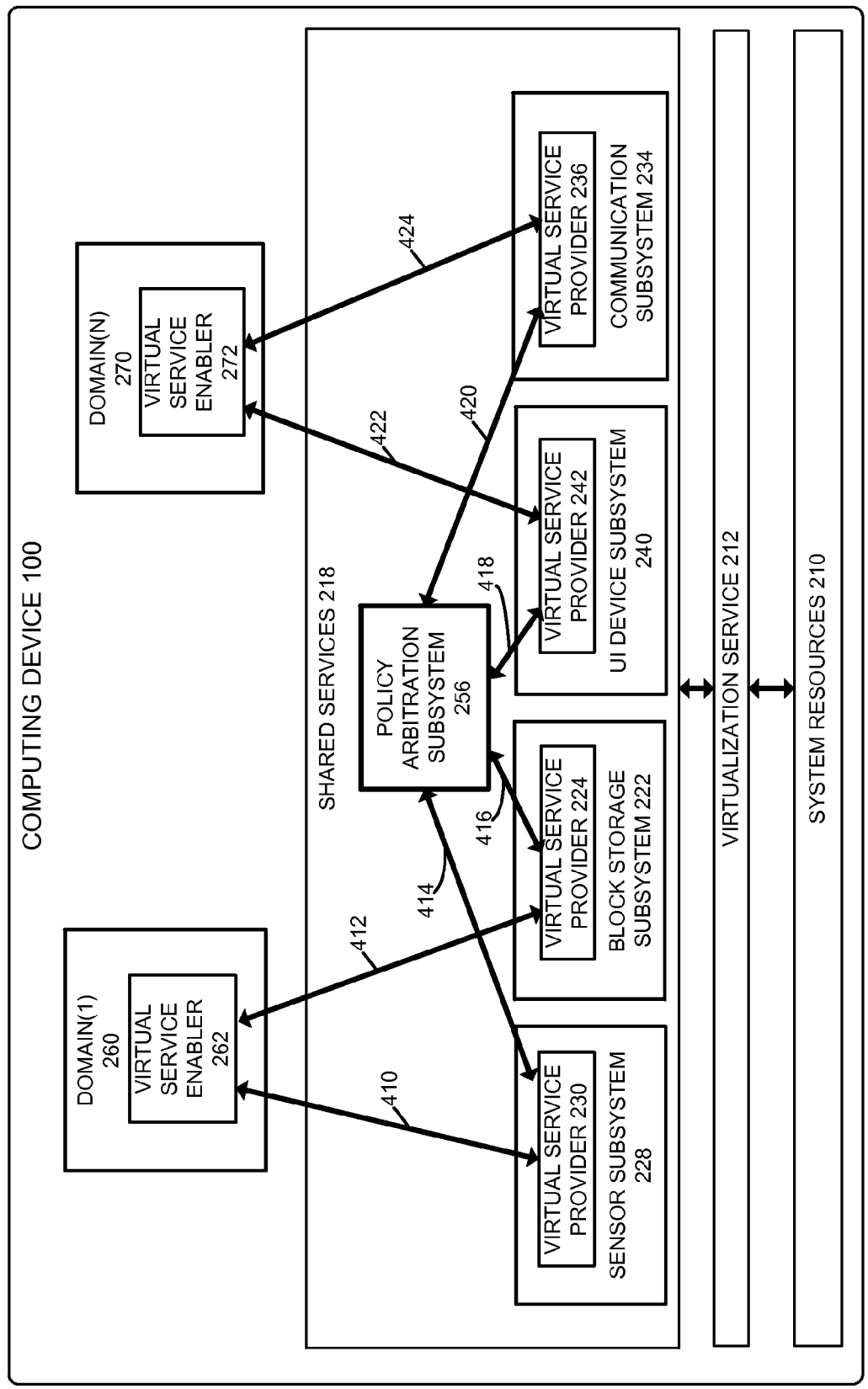
FIG. 4 is a simplified module diagram of an illustrative portion of the virtualized execution environment of FIG. 2, illustrating at least one embodiment of an information flow control scheme as disclosed herein.

Referring now to FIG. 4, a simplified example of the process isolation or "information flow" isolation features of the illustrative platform 100 is shown. FIG. 4 illustrates a MILS-based embodiment comprising architectural components (e.g., components 210, 212, 222, 228, 234, 240, 260, 270), and explicitly defined interactions between the components (e.g., arrows 410, 412, 414, 416, 418, 420, 422, 424, 426, 428), where the presence or absence of an arrow is significant (e.g., the absence of an arrow indicates the absence of a communication channel). The bidirectional arrows 410, 412, 414, 416, 418, 420, 422, 424, 426, 428 each represent a well-defined communication channel that may be unidirectional for some domains 260, 270 or shared services 218 and bidirectional for other domains 260, 270 or shared services 218, depending upon the applicable security policy. As used herein, "well-defined" refers to a communication channel (e.g., any suitable type of optical, wired, wireless, or logical signal path) that only has two possible endpoints (e.g., a source and destination or vice versa) and cannot be modified by any domains 260, 270 or shared services 220. For instance, in some embodiments, hardware restrictions may be provided by a computing device's original hardware design (e.g., an 12C bus layout or intra-bus connects within an SoC). In the context of software virtualization of a communication bus, a privileged controller (e.g., a hypervisor supervising single-service access to an approved hardware resource) can restrict access to a communication channel by different "users" (e.g., domains 260, services 218), rather than designing the device hardware to include additional buses for each special purpose channel (e.g., lx physical bus per virtualized service). In other words, the well-defined communication channels may be embodied as, for example, hypervisor-supervised secure multiplexed communications over a single bus/physical transport or as multiple independent buses that each ensure singleton security.

Thus, in the embodiment of FIG. 4, each of the domains 260, 270 can only access the system resources 210 through the respective defined communication channels 410, 412, 414, 416, 418, 420, 422, 424, 426, 428 and can only do so through the virtualization service 212 and shared services 218. However, the arrangement shown in FIG. 4 is by no means the only possible arrangement of communication channels. For example, in other embodiments, the domains 260, 270 may communicate with the shared services 220 through the policy arbitration subsystem 256 (e.g., communications may be monitored by the policy arbitration subsystem 256 for policy compliance). Further, it should be understood that similar communication channels exist between components of the modular security services 250 and other shared services 218, even though not explicitly shown in the drawings.

Unique security labels may be programmatically associated with each of the well-defined communication channels so that the components of the trusted computing base can monitor communications that are sent between the different components 280 (e.g., domains 260, 270 and shared services 218) of the computing device 100. For instance, the policy arbitration subsystem 256 can mediate the communications that occur over the channels 410, 412, 414, 416, 418, 420, 422, 424, 426, 428 according to applicable policies, in accordance with the requirements of the computing device 100. The assignment of communication channels to the components 280 and the assignment of security labels to communication channels may be performed at the time that the computing device 100 is designed and/or provisioned (e.g., by an original equipment manufacturer or OEM). For example, the communication channels may be established at or around the time that the memory partitions for the domains 260, 270 and shared services 218 are created.

Some embodiments of the illustrative platform 100 are modularized in the sense that at runtime, each of the running instances of the domains defined by the domain specifications 142, as well as the components of the trusted computing base 130, 140, 160, are both memory-isolated (e.g., data separation) and process-isolated (e.g., information flow control) from one another. To do this, as illustrated by FIG. 3, at installation time, the shared services 220, shared security services 250, domains 260, 270, and the virtualization service 212 are each allocated and assigned to their own address space in physical memory (e.g., block storage). Further, as illustrated by FIG. 4 and described below, only well-defined (e.g., by static firmware-enforced or physical hardware restrictions) communication channels exist between the modules 122 and the virtualization service 212, so that module communications can be tightly controlled according to the requirements of the current configuration of the computing device 100. As such, in some embodiments, the modular, virtualized architecture described herein represents an application of certain aspects of the MILS architecture mentioned above.

Virtualization Subsystems

The illustrative data storage 164 is embodied as persistent physical storage, e.g. as a block device, which can read and write data in blocks having a fixed or nominal size (e.g., 512 bytes or a multiple thereof). As such, the data storage 164 may include one or more hard drives, optical drives (e.g., CD- or DVD-ROM), compact flash memory (e.g., memory sticks or memory cards), and/or other such devices.

In some embodiments, the integrity parameters 166 used by the secure boot logic 118 and/or other modules 122 are stored, at least temporarily, in the data storage 164. In some embodiments, portions of the security keys 120, the virtualization service 160 and/or the modules 122 may reside at least temporarily in the data storage 164, as well. Portions of the security keys 120, any of the modules 122, the virtualization service 160, and/or the integrity parameters 166 may be copied to the memory 112 during operation of the computing device 100, for faster processing or other reasons.

As noted above, the communication subsystem 158 may communicatively couple the computing device 100 to other computing devices and/or systems by, for example, a cellular network, a local area network, wide area network (e.g., Wi-Fi), personal cloud, virtual personal network (e.g., VPN), enterprise cloud, public cloud, and/or public network such as the Internet. For instance, the policy arbitration subsystem 136 may be used in the context of "cloud" virtualized services, in some embodiments. The communication subsystem 158 may, alternatively or in addition, enable shorter-range wireless communications between the computing device 100 and other computing devices, using, for example, Near Field Communication (NFC) technology. Accordingly, the communication subsystem 158 may include one or more optical, wired and/or wireless network interface subsystems, cards, adapters, or other devices, as may be needed pursuant to the specifications and/or design of the particular computing system 100. In some embodiments, the communication subsystem 158 includes one or more telephony subsystems, which enable the computing device/platform 100 to provide telecommunications services (e.g., via a baseband processor). The telephony subsystem(s) generally include a longer-range wireless transceiver, such as a radio frequency (RF) transceiver, and other associated hardware (e.g., amplifiers, etc.). To provide voice communication services, the telephony subsystem may include an audio subsystem, which may include, for example, an audio CODEC, one or more microphones, and one or more speakers and headphone jacks. In some embodiments, other wireless communication subsystems (e.g., Ethernet, BLUETOOTH, wireless LAN (WLAN), etc.) and/or other services (e.g., GPS) may interface with, e.g., the baseband processor alternatively or in addition to the applications processor.

The computing device 100 may include other components, sub-components, and devices not illustrated in FIG. 1 for clarity of the description. In general, the components of the computing device 100 are communicatively coupled as shown in FIG. 1 by electronic signal paths, which may be embodied as any type of wired or wireless signal paths capable of facilitating communication between the respective devices and components.

The software module management service(s) 168 may include, for example, third-party platform management services (e.g., MDM services) or similar services that may be in communication with the computing device 100 over a network or a variety of different types of networks and communication media, via the communication subsystem 158. Such services 168 may be used to, for example, develop, manage, and implement security policies for the computing device 100, such as enterprise security policies or mobile device BYOD (bring your own device) policies.

The illustrative security services 250 operate independently but in conjunction with one another and with the other shared services 220 and the virtualization service 212, to provide security features for the various domains 260, 270 running on the computing device 100. For instance, the integrity verification subsystem 252 may be called upon by the virtualization service 212 to check the integrity of a module or component of the computing device 100, e.g., at load time or at run time, and/or in response to a triggering event. An illustrative example of the integrity verification subsystem 252 is described in the aforementioned Oberg et al., U.S. patent application Ser. No. 13/872,865.

The illustrative provisioning subsystem 254 represents an executing instance of the provisioning subsystem 134, which defines, verifies, and maintains the component configuration for the device and each of the individual domains 260, 270. An illustrative example of the provisioning subsystem 254 is described in more detail in the aforementioned related application, Oberg et al., U.S. application Ser. No. 14/051,923.

The illustrative domain manager subsystem 258 represents an executing instance of the domain manager subsystem 138, which defines rules and specifications for, and in operation (258) controls and manages, the initialization, execution, activation, and deactivation of the domains 260, 270 globally, e.g., at the computing device level. An illustrative example of the domain manager subsystem 258 is described in more detail in the aforementioned related application, Saidi et al., U.S. application Ser. No. 14/052,169, now U.S. Pat. No. 9,495,560.

The domain manager subsystem 258 can switch operation of the computing device 100 from a highly sensitive domain (e.g., an enterprise domain) to a less-sensitive domain (e.g., a personal/social use domain), or vice versa, in response to a triggering event (e.g., dynamically, or in real time). Such a triggering event may include, for example, the receipt of user input such as tactile or speech input, a gesture, a specific software command, or a user name and password. The detection of certain inputs from one or more of the sensors 152 may also act as a triggering event. For example, if the computing device 100 detects, based on sensor data, that the user has entered a highly secure geographic area (such as a corporate office or a research facility), the domain manager subsystem 258 may autonomously (e.g., without requiring any user input) disable the user's access to any less-secure domains and only permit the user to access a highly secure domain on the computing device 100.

Shared Services

Using these technologies, the virtualization service 212 in conjunction with the shared services 218 controls the use and sharing of the various system resources 210 by the domains 260, 270, according to the security policies or requirements of the computing device 100. For instance, the trusted computing base 212, 218 can mediate software module communications so that the system resources 210 may each be accessed and used by only one of the domains 260, 270 at any given time. As an example, if the user of the computing device 100 is operating in an "enterprise" user domain and the user is a lawyer recording a deposition or a police officer videotaping a crime scene, the trusted computing base 212, 218 can ensure that, while the enterprise domain is using the device's camera, the camera cannot be accessed by the user's "personal" user domain, e.g., to take pictures or video.

Virtualized software services may be provided by any virtual service provider 224, 230, 236, 242, such as those to which the policy arbitration subsystem 256 can control access, including local software or hardware services (e.g., encryption services, network access, touchscreen display, audio input or output, etc.). At runtime, the virtualization service 212 communicates with the virtual service provider modules 224, 230, 236, 242 that are embedded in the shared services 220, and the virtual service enabler modules 262, 272 that are embedded in the domains 260, 270, respectively. The virtual service providers 224, 230, 236, 242 translate and map the virtualized operations of their respective shared service 220 to its physical counterparts, in order to provide access to a corresponding system resource 210 to, e.g., a domain 260, 270. Similarly, the virtual service enablers 262, 272 translate and map the virtualized operations of their respective domains 260, 270, to enable the domains 260, 270 to utilize (or "consume") system resources to which access is provided by the service providers 224, 230, 236, 242. Together, the virtualization service 212, the modularized virtual service providers 224, 230, 236, 242, and the modularized virtual service enablers 262, 272 provide a level of abstraction between the components 280 (e.g., each of the domains 260, 270 and the shared services 218) and the system resources 210. In other words, the virtualization service 212, the virtual service providers 230, 242, and the virtual service enablers 262, 272 provide (e.g., hardware) abstractions of some or all of the system resources 210, for each of the domains 260, 270 and the shared services 218. As shown by FIG. 4 and described in more detail below, the policy arbitration subsystem 256, alone or in conjunction with other modular security services 250, oversees the communications between the virtual service providers 230, 242, the virtual service enablers 262, 272, and the system resources 210 through the virtualization service 212.

In the example execution environment of FIG. 2, the trusted computing base, which generally operates in the privileged mode of the computing device 100, includes the executing instance of the virtualization service 212 and the executing instances of the shared services 218. In some embodiments, the privileged shared services 218 are implemented as middleware that interfaces with the virtualization service 212 to control and manage the execution of the various domains 260, 270. The shared services 218 include the executing instances of the modular shared security services 250 and the other shared services 220.

The other shared services 220 communicate with the virtualization service 212 through a respective virtual service provider 224, 230, 236, 242 to provide their respective hardware abstractions in a modular way. For instance, the block storage subsystem 222 virtualizes the I/O communications with block storage devices 226 (such as the firmware 116 or data storage 164). The block storage subsystem 222 thereby acts as a virtual device driver service that can be called upon by other modules of the trusted computing base or by the domains 260, 270, through the virtualization service 212, to move data out of block storage and into random access memory or vice versa. As an example, the integrity verification subsystem 252 may, through the virtualization service 212, communicate with the block storage subsystem 222 to obtain one or more of the integrity parameters 166.

The sensor subsystem 228, the communication subsystem 234 and the user interface device subsystem 240 operate similarly, in that they provide access to their respective system resources 232, 238, 244 through modularized abstractions (e.g., virtual drivers). For example, the domain manager subsystem 258 may obtain sensor data from the sensor subsystem 228 through its interface with the virtualization service 212 and the virtual service provider 230. As another example, the integrity verification subsystem 252 may send integrity data (e.g., an indication of whether a particular software module 122/280 passed or failed an integrity check) to a mobile device management system by interfacing with the virtualization service 212 and the virtual service provider 236. Through this modularization of the system architecture and the isolation techniques described herein, embodiments of the computing device 100 can confine security issues to the components 280 and/or system resources 210 that may be affected.

Figure 5:
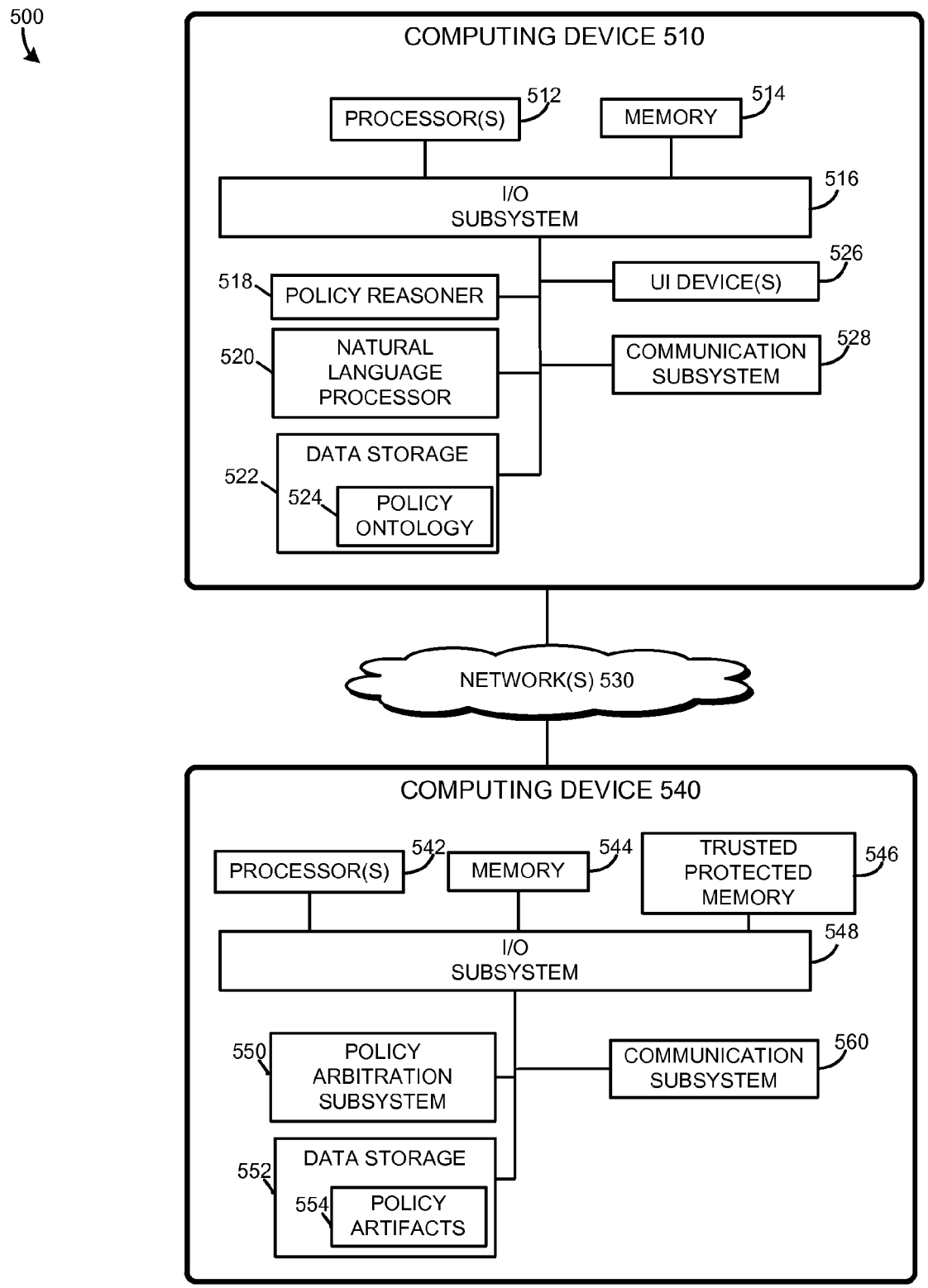
FIG. 5 is a simplified block diagram of at least one embodiment of a networked computing system, including a policy reasoner and a policy arbitration subsystem as disclosed herein.

In the illustrative execution environment 200, the domains 260, 270 are embodied as user domains that execute as "guests" of the virtualization service 212. That is, the user domains 260, 270 execute in a lower-privileged mode, as to not be able to bypass or reconfigure the memory or process isolation provided by the virtualization service 212, or for other reasons. As a result, the domains 260, 270 are lesser-privileged execution environments than that provided by the higher-privileged virtualization service 212. The operating systems 264, 274 and software applications 266, 276 executing in each of the domains 260, 270 may be the same or different. For instance, in some embodiments, the domain 260 may execute the ANDROID operating system while the domain 270 may execute the QNX operating system, or the domains 260, 270 may execute different versions of the same operating system. As another example, the domain 260 may execute a self-contained e-mail program and a web browser without a typical operating system, while the domain 270 may execute an electronic medical records system but not e-mail or web browser applications. Policy Referring now to FIG. 5, an illustrative computing system 500 includes a policy reasoner 518 embodied in a computing device 510, and an embodiment of the policy arbitration subsystem 550 embodied in another computing device 540. The computing devices 510, 540 are at times in communication with each other via one or more networks 530 (i.e. during provisioning, policy updates, and status reporting back to the provisioning subsystem 254). For example, the network(s) 530 may communicatively couple the computing devices 510, 540 to each other and/or to other computing devices and/or systems by, for example, a cellular network, a local area network, wide area network, personal cloud, virtual personal network (VPN), enterprise cloud, public cloud, and/or public network such as the Internet. The illustrative computing devices 510, 540 and the network 530 are depicted in simplified form for ease of discussion. It should be understood that either or both of the computing devices 510, 540 may be configured in a similar manner to the computing device 100 and have one or more similar components thereto. For example, the computing device 510 and/or the computing device 540 may include all or a subset of the components of the computing device 100. In general, the components of the computing system 500 having similar or identical names to components shown in FIG. 1 and/or described above may be embodied in a similar fashion to the corresponding components described above. As such, reference is made here to the foregoing description and such description is not repeated here.

Referring now more specifically to FIG. 6, the illustrative policy arbitration subsystem 256 is embodied as a number of computerized modules that, in some embodiments, may exist within an isolated domain (e.g., APIs, physics-based controls, etc., as mentioned above) that utilize the policy artifacts 554 as described in more detail below. The illustrative policy arbitration subsystem 256 is embodied as a policy manager 610, which includes a policy provisioning module 612, a least restrictive conforming policy (LRCP) engine 616, a policy arbitrator 620, and an event trigger handler 622. The policy provisioning module 612 creates and maintains a policy pool 614, which includes or contains references to the policy artifacts 554 of all of the domains 260, 270 that have been successfully provisioned on the computing device 100. The policy pool 614 may be implemented as, for instance, a database, table, linked list, or similar suitable data structure. The LRCP engine 616 applies conflict detection and solution finding algorithms to the policy pool 614 to determine the active device policy 618. The policy arbitrator 620 more or less continuously applies the active device policy 618 to the current operating context of the computing device 100 and re-engages the LRCP engine 616 as needed to handle changes to the policy pool 614 caused by domain provisioning, policy updates, and domain deprovisioning. The policy event handler 622 (discussed in more detail elsewhere in this document) receives and analyzes domain triggered events 640 and/or event triggers 642 to, among other things, determine if said event will cause an action based on the current active device policy 618.

The methods and processes disclosed herein and illustrated in the drawings are simplified for discussion purposes, but it should be understood that the device 100 and/or the computing system 500 may undertake any of the disclosed methods or processes concurrently or in parallel, e.g., for each of the executing domains 260, 270. For example, the device 100 and/or the computing system 500 may perform an analysis of any policy artifacts 554, domain triggered events 640 and/or event triggers 642 that it receives from any or all of the domains 260, 270, in whatever order or sequence they may occur.

In some embodiments, communication channels similar to those shown in FIG. 4, described above, are defined between the domains 260, 270 and the policy arbitration subsystem 256 so that communications such as domain-specific policy artifacts 554, domain triggered events 640, and event triggers 642 (FIG. 6) can only be sent from the domains 260, 270 to the policy arbitration subsystem 256 over the defined communication channels, and the policy artifacts 554, domain triggered events 640, and event triggers 642 cannot be sent from the domains 260, 270 directly to any of the system resources 210 (that is, without going through the policy arbitration subsystem 256). In this way, the configuration of communication channels enables the policy arbitration subsystem 256 to act as an intermediary to prevent policy artifacts 554, domain triggered events 640, and event triggers 642, which may have been initiated by potentially untrusted (or assumed untrusted) domains 260, 270, from reaching the system resources 210 without the proper vetting (which is performed by the policy arbitration subsystem 256).

Beyond Virtualization

Portions of this disclosure describe embodiments of a policy arbitration subsystem that is adapted for use on a mobile computing platform that has a modular, virtualized system architecture. Some embodiments of modular, virtualized mobile computing platforms can be configured with multiple user-level execution environments, each of which may be tailored for a different use or application of the mobile device. A mobile platform designed with such an architecture can, for example, address security issues that commonly arise when personal mobile devices are used for business purposes or vice versa. Nonetheless, it should be appreciated that the disclosed approach is not limited to virtualized mobile platforms; rather, aspects of the disclosed approach can be used in traditional and/or virtualized platforms to, for example, extend a static, global policy to a more flexible implementation in which multiple independent and potentially conflicting policies (e.g., enterprise vs. personal) can be mitigated using a variety of techniques, including context aware policy, reasoner-based policy creation, LRCP discovery and disabling of features. However, virtualization can increase the assurance that the social contract as disclosed herein can be correctly enforced even when untrusted, possibly compromised, peer user domains are present.

Policy "Suite"

Again referring now to FIG. 1, an illustrative policy arbitration subsystem 136 is embodied as software, firmware, hardware, or a combination thereof, to perform policy rule arbitration services during the operation of a computing device 100. In some embodiments, the policy arbitration subsystem 136 comprises a "suite" of computer programming constructs (e.g., both on and off-device.) For example, the policy arbitration subsystem 136 may define an application programming interface (API) or a suite of APIs or API extensions. The APIs may be implemented as a software library, a software framework (e.g., a collection of different software libraries implementing different APIs), a protocol or set of protocols, or another type of programming interface that allows computer programs to communicate with each other and with shared computing resources. As noted above, embodiments of the policy arbitration subsystem 136 or portions thereof may be implemented in or to control hardware components (e.g., as physics-based policies).

Thus, while not specifically shown in FIG. 1, it should be understood that portions of the policy arbitration subsystem 136 can reside on other computing devices or computing systems, in some embodiments as a distributed policy system. For example, a portion of the policy arbitration subsystem 136 may be local to the computing device 100, while another portion may be distributed across one or more other computing systems or devices that are in communication with the computing device 100 by one or more electronic communication networks, via communication subsystem 158, for example. In other embodiments, the policy arbitration subsystem 136 may be located entirely on the computing device 100.

Policy Artifacts

As mentioned above, in some embodiments, each domain 260, 270 or other components 280, or group of domains or components, has its own defined policy, which may specify, for example, permitted accesses and uses of the various system resources 210 by the domains 260, 270 and/or other components 280 in different contexts. In some embodiments, these "domain-specific" (for ease of discussion) policies are embodied as policy artifacts 554. The policy artifacts 554 may be derived from natural language statements, and may include instructions relating to a purpose and an anti-purpose, as described above and in more detail below with reference to FIG. 7.

Triggers

To provide scope for the various actions performed (as described below), embodiments of the disclosed policy arbitration subsystem use event triggers created by processing and monitoring the shared services subsystems described above. In some embodiments, event triggers are provided directly by the trusted domains (e.g., network, I/O, and domain management subsystems). In other embodiments, inline monitor domains can be used to provide trusted triggers. In any embodiment, some examples of triggers include but are not limited to timers, sensor input (i.e. GPS, accelerometer, proximity), I/O (i.e. touchscreen, buttons), network actions (i.e. magic packets, subnet, computer connectivity, WIFI access points), externally networked devices, and events created by the domain management subsystem (i.e. initialization, execution, activation, domain switch). Additionally, the policy artifact of a domain can contain triggers which the user domain can directly trigger (i.e. mode switch). As many triggers have bounded scoped (i.e. a region defined by GPS coordinates, a WIFI AP SSID (Service Set Identifier—e.g., a public name for a wireless network, a IP (Internet Protocol) subnet), mutual exclusive (non-overlapping) regions allows cases where policy restrictions to a trigger source can still allow detection and triggering events in non-restricted regions (as examples are provided below when discussing rule chains). While the interface is similar between these normal event triggers and domain event triggers, there are some differences. For example, in some embodiments the trusted status of the normal event triggers allows the disclosed policy arbitration subsystem to utilize other components within a Trusted Platform Module (TPM) to determine if items are mutually exclusive or not as required by the LRCP engine discussed below. In these embodiments, the policy arbitrator is simplified as it does not need to include the logic specific to each trigger or, discussed next, action. As user domains are part of the TPM, they may not be trusted to perform this logic for the policy arbitration subsystem. Furthermore, the policy arbitration subsystem may not know when the generic domain event trigger is mutually exclusive. As such, mutual exclusivity (or scope reduction) can occur if a domain event trigger cannot be triggered when the domain is not executing.

An example of a domain triggered event 640 is an event that arises from the operation of a domain 260, 270, such as user-level software 144 executing in a domain requesting access to a system resource 210. As such, domain triggered events 640 may include, among other things, application or operating system requests to activate the camera, obtain GPS information, send or receive a message, connect to a wireless access point, etc. An example of an event trigger 642 is an event that arises out of the current operating context of the device, typically independently of any domain or component of the device. Event triggers 642 may include information that is sensed or otherwise detected or obtained by any of the sensors 152, other peripheral devices 156, or communication subsystem 158. As such, event triggers 642 may include, among other things, the detection or lack of detection of particular GPS locations, wireless access points, or IP addresses, or the occurrence of an activation or deactivation of a camera, microphone, or other system resource 210. In some instances, event triggers 642 may be initiated by or result from the activities of a component of the trusted computing base, such as the virtualization service 160 or a shared service 218. For ease of discussion, domain triggered events 640 and event triggers 642 may be referred to herein collectively as "event triggers," "events," or "triggers."

Policy Actions

The policy artifacts 554, 800 contain rule chains of triggers and actions of different types. Some rules chains (e.g., "disable" actions) may completely restrict access to or use of a system resource 210, at least temporarily while the chain is in effect. Other rule chains (e.g., "filter" actions) may only partially restrict access to or use of a system resource 210. Further, some of the rule chains may be unconditional in that they apply in all circumstances, while others may be conditional, in that they are only enforced in response to a defined trigger event. For example, an artifact 554, 800 issued by an "enterprise" domain may contain a rule chain that completely disables a camera feature of the computing device 100 for a "personal" domain when the computing device 100 detects (using, e.g., an integrated sensor 152 or peripheral device 156, such as a GPS transceiver) that the device 100 is at a particular geographic location (e.g., on company property). Similarly, the policy artifact 554, 800 issued by the personal domain may contain another rule chain completely disable a microphone of the computing device 100 for the enterprise domain when the user has answered a telephone call in the personal domain. Another rule chain of the enterprise domain issued artifact 554, 800 may prevent the personal domain from connecting to a particular IP address when the device 100 is in a particular geographic location (e.g., on company property). Another rule chain of the personal domain artifact 554, 800 may prevent the enterprise domain from connecting to the user's home wireless access point when the device 100 is in a particular geographic location (e.g., within range of the user's home). Yet another rule chain of the personal artifact 554, 800 may prevent the use of a touchpad of the device 100 for text messaging when the device 100 determines (e.g., using an integrated sensor 152, such as the GPS) that the user is likely to be driving a vehicle.

In addition, the policy arbitration subsystem 256, which arbitrates communication channels, may provide for the downgrading or filtering of information on such channels to different domains. As an example, where the computing device 100 captures GPS data, the policy arbitration subsystem 136 may permit the computing device 100 to send highly accurate geographic location values to a security-vetted domain, but only permit the computing device 100 to send rough approximations of the same geographic location information to un-vetted third party domains. Other sensors and data types can also benefit from the arbitration of content downgrading by performing similar per-domain resolution adjustments and other data manipulations.

Rule Chains, MPR, and MRR

To do this, the illustrative policy arbitration subsystem 256 stipulates that each domain's policy artifact includes a number of policy implementation options 1 to N (where N is any positive integer), as well as a set of minimum provisioning requirements 630 and a set of derived minimum runtime requirements 632. In general, the minimum provisioning requirements 630 comprise essentially non-optional provisioning policies; e.g., conditions that must be satisfied in order for a domain to be successfully provisioned on a device both in terms of functionality and security requirements. For example, an enterprise domain may have a minimum provisioning requirement (MPR) that the device have access to GPS information. If an attempt is made to provision the enterprise domain on a device that does not have GPS capabilities, the MPRs will instruct the policy provisioning module 612 that the provisioning attempt should fail, unless the MPRs are flagged as suggested or optional (as discussed later). Another example is a requirement that the policy artifact be updated by a certain event or time deadline to ensure a given domain's policy is regularly updated. Should the deadline expire, this MPR could trigger the domain to wipe itself from the device. MPRs can also be hardware or platform requires such as non-bypassable DIT (Data-in-Transit) and DAR (Data-at-Rest), hardware encryption, or high-security key storage.

Similarly, the minimum runtime requirements 632, derived from the active policy implementation selected from the policy artifact, comprise essential runtime policies; e.g., conditions that must be satisfied in order for a domain to be permitted to execute on a device. For example, a financial services domain may have a minimum runtime requirement (MRR) that no other domain can have access to or use any camera of the device while the financial services domain is running. If an attempt is made to launch the financial services domain while another domain is running that has access to the camera(s) of the device, the MRRs will instruct the policy arbitrator module 620 that the financial services domain cannot run until the other domain is deactivated or releases access to the camera. Some other examples of system resources 210 that may be the subject of minimum runtime requirements include network services (which may be required to, for example, enable MDM services) and memory devices (which may be required to, for example, store and provide digital certificates or authentication keys). As with the MPRs, there may be some instances in which MRRs are flagged as suggestion or optional as the lack of the requirement will provide a degrade user experience but still fulfilling the security requirements. Like the above MPR example regarding a policy artifact to be updated by a deadline, a MRR could instead just not allow a domain with an expired policy artifact to execute or simply display a dialog or notification every time the domain is activated.

Figure 8:
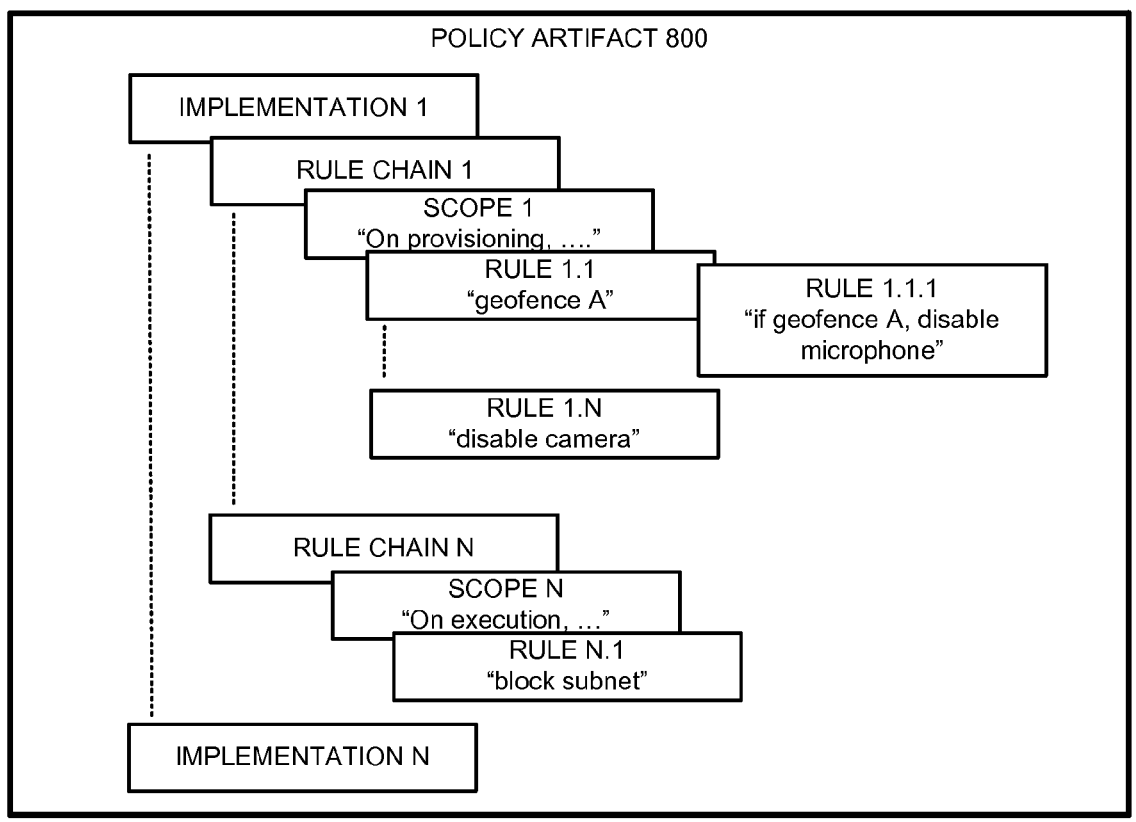
FIG. 8 is simplified illustration of at least one embodiment of a policy artifact as disclosed herein.

Referring now to FIG. 8, a simplified embodiment 800 of the policy artifact 554 is shown. The policy artifact 800 comprises a number of policy implementation options (1 to N). Illustratively, the implementation option 1 includes a number of rule chains (1 to N), where each rule chain includes one or more scope conditions and one or more rules triggered by each scope condition. The policy implementation options allow the policy arbitration subsystem 256 to seek the least restrictive conforming policy across all of the provisioned domains on the device, and the rule chains enable the policy arbitration subsystem 256 the flexibility to tailor the least restrictive conforming policy to the current device context. Through the rule chains, the implementation options can specify, implicitly or explicitly, their requirements. For example, "Enterprise" may wish to block other domains from accessing a given subnet when connected to the corporate network. One implementation option could block said subnet whenever "Enterprise" can connect to a known corporate server thus may require the device to be capable of pinging the subnet address. However, an implementation option that stipulates, "block if connected to access point" may achieve the same end result without requiring the ability to ping the subnet, and can thus circumvent attempts to disable pinging. As an example, the rule chain 1 specifies a scope requirement "on provisioning," meaning that the rule chains 1.1 and 1.N are to be enforced when the domain is provisioned. Thus, in this example, the affected device is to geo-fence an area A and disable the device's camera when the domain is provisioned (where "geo-fence" may refer to a system-defined geographical area or the perimeter of such an area, which may be predefined or dynamically-generated). As a result, such geo-fencing and disabling of the camera may occur even if the domain is not currently executing on the device.

The rule chain 1 contains a second level, rule 1.1.1, which specifies that if A is geo-fenced, then the device's microphone is to be disabled. As such, disabling the microphone need only occur if the geo-fence condition is already met. Further, the rule chain N is implicated on execution of the domain and calls for blocking a subnet upon domain execution. As such, the subnet need only be blocked if the domain is executing (and not, for example, if the domain is merely provisioned, initialized, or has been deactivated). In this way, the rule chains allow for finer granularity and context-dependency of restrictions on the use of system resources, and for the release of restrictions when the conditions giving rise to the restrictions cease to exist.

Suggested, Optional Requirements & Overrides

At times, the stakeholder of a policy artifact may want to provide a suggested ability be present for the functionality the paired user domain. For example, in order for the "Enteprise" e-mail to function, the user domain needs access to the corporate mail server at a given address. If for some reason said server address has been restricted by another, pre-provisioned domain, this would cause a conflict that would prevent the successful provisioning of the "Enterprise" domain. As e-mail access may only be one of many features provided by the "Enterprise" domain, the stakeholder may simply make this a suggested or optional requirement. Should this policy be used, a warning may be displayed to the user notifying them of the functionality reduction, and the user may be allowed to override the conflict, thus allow the domain to be provisioned.

Cross Domain Resource Sharing

In embodiments where the policy artifacts are provisioned per user domain and the user domains are unaware of the other domains on the device, a number of apparent limitations may appear should a stakeholder wish to have more than one domain on a device. For example, if a domain stakeholder desired to prevent "all other domains from accessing subnet A" in both domains, then domain 1 would prevent domain 2 from having access to subnet A and domain2 would likewise prevent such access by domain 1. To account for this, embodiments of the policy artifacts can be signed with an asymmetric key and the stakeholders can "share" a resource (i.e. network) with those domains having a matching key. In embodiments where policy artifacts are not shared with other domains, the policy arbitration subsystem may perform the comparison of keys and internally bond the specified resource of user domains with a successful match.

Policy Creation, Deployment, and Management

One application of the disclosed suite of utilities is in the enterprise BYOD market, in which corporations configure a user domain with all of the tools and shortcuts required by their employees, along with the policy required by the corporation. As corporations often have different stakeholders (e.g., divisions, departments, job roles) for each employee, some embodiments of the policy arbitration subsystem may be dynamic for per-employee customization based upon roles, responsibilities or other factors. In such a system, stakeholders may contribute high-level policies to a corporate database. With each change to the policy storage database, an automated system updates all policy artifacts for the employees affected by the change. For example, if the department adds a requirement for a given IP address, then the policy artifacts for all employees of that department will be automatically updated as well. In turn, this may queue a policy artifact update (either by direct or private "domain store") for any employee which had previously provisioned a device.

Another application of the disclosed policy arbitration suite is for generic, ready-to-use user domains as well as purpose specific mobile appliances. In these applications, policy artifacts may be generic across users and the more generic, public "domain store" option for provisioning may apply. While a general "personal" user domain may have very little included in its policy artifact, other embodiments, such as a financial institutions mobile appliance, may include heavy restrictions and requirements for privacy and security.

Policy Creation

Figure 7:
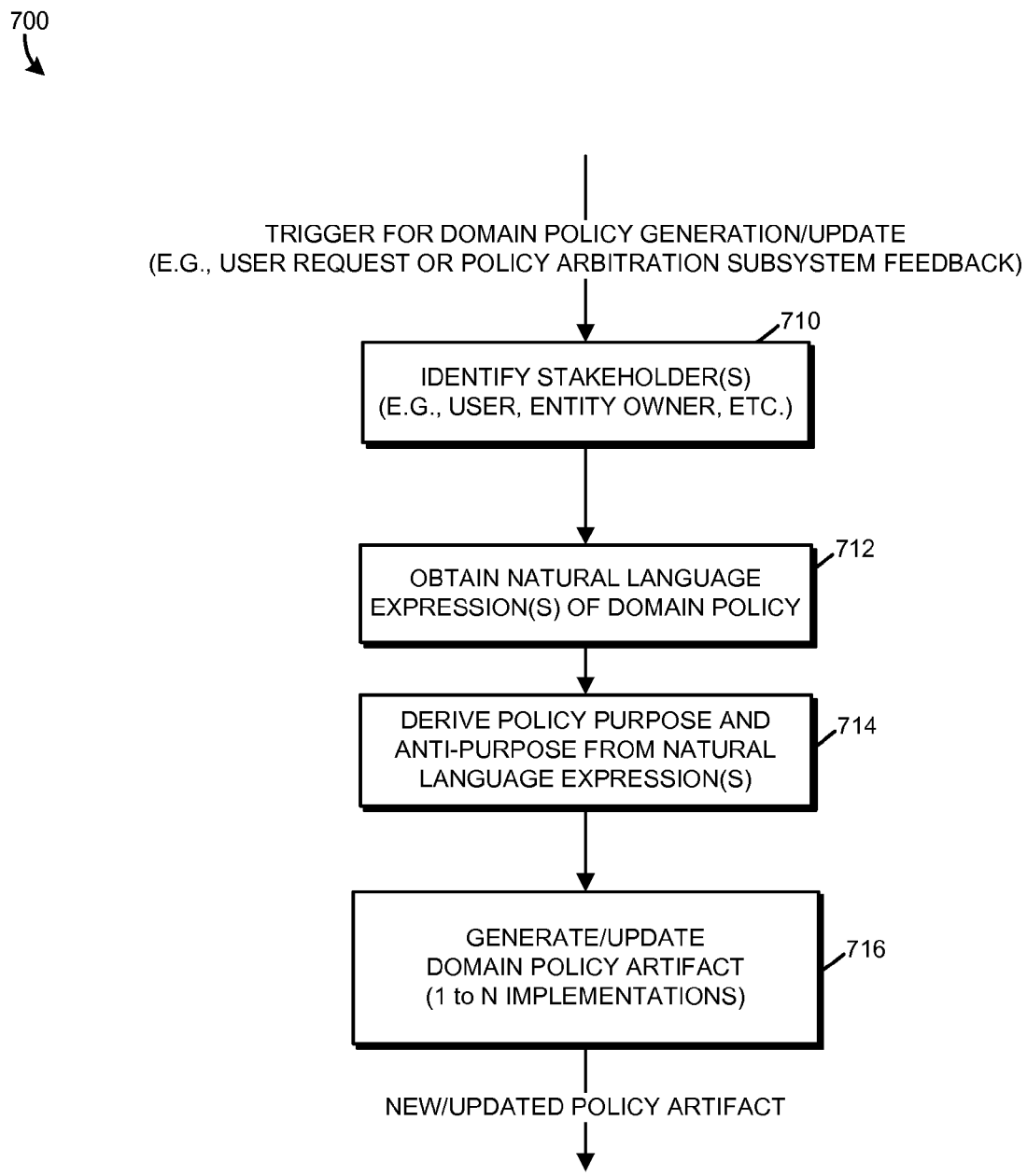
FIG. 7 is a simplified flow diagram of at least one embodiment of a method for creating policy artifacts as disclosed herein.

Referring now to FIG. 7, an illustrative method 700 for generating a policy artifact is shown. The method 700 may be embodied as computerized programs, routines, logic and/or instructions executed by the computing device 100 or by the computing device 510 (by the policy reasoner 518, for example). At block 710, the method 700 is initiated by the receipt by the device 100, 510 of an electronic communication containing a request or trigger to generate or update a policy (e.g., a domain-specific policy). In response to the request or trigger, the device 100, 510 identifies the relevant stakeholders. Such stakeholders may include, for example, the various internal organizations of the domain owner (e.g. division, department, job title, user specific). To enable the lookup of applicable stakeholders, identifying information of the end user may be contained in the request or trigger communication, or may be provided electronically by the stakeholder in response to the device 100, 510's acknowledgment of the trigger, for example.

At block 712, the device 100, 510 obtains one or more conversational natural language expressions of a purpose or policy for a domain. As described above, the device 100, 510 may invoke a virtual personal assistant-type application to engage the stakeholder in a person-device conversational dialog exchange to obtain the needed information about the domain and the desired purpose or policy for the domain. At block 714, the device 100, 510 derives the policy purpose and anti-purpose from the natural language expression(s) obtained at block 712. As mentioned above, the "purpose" of a domain may include an expression of some beneficial activity that is desirable for the domain to perform, while the "anti-purpose" may include an expression of a harmful or potentially harmful activity that is desired to be precluded when the corresponding purpose is enabled. For example, a "purpose" may be expressed as "allow the enterprise domain to connect to the corporate subnet when I am on company property" while a corresponding anti-purpose may be to "prevent the personal domain from connecting to the corporate subnet."

In different embodiments, the policy reasoner 518 may have a number of different front end interfaces that will help gather policy context, which may be used to create the policy artifact 554. Such front end interfaces may include, for example, a natural language parser, a step-by-step wizard-based solution, or direct definitions. In any case, the policy reasoner 518 can process the high-level, descriptive details about policy requirements and policy enforcement environment(s) (e.g., what could be used to define "work resources" for a particular user or to detected when the user is at "work"), derive the policy purpose and anti-purpose, and then convert these into a policy artifact 554, which contains multiple implementations based on various options presented by the architecture and policy enforcement environments. The context provided by using high-level descriptions and overview of the enforcement environment(s) allow the various implementation options to handle possible resource restrictions that may be imposed by another domain that is already provisioned on the device 100, 510.

To derive the purpose and anti-purpose, the device 100, 510 applies the policy ontology 524 to, for example, determine relationships between the stated purpose or policy and purpose/policy/anti-purpose information contained in or referenced by the policy ontology 524 and/or an associated knowledge base (which may include, for example, searchable database tables populated with specific data values, rules, and/or computer instructions that relate to natural language statements) and thereby map elements of the natural language expression to elements of the policy ontology 524 and/or associated knowledge base. At block 716, the device 100, 510 generates or updates (as the case may be) the domain policy artifact 554, which, as discussed above, may include a number of policy implementation options. To do this, the device 100, 510 again refers to the policy ontology 524 and/or an associated knowledge base to map the derived purpose and anti-purpose to their corresponding machine-readable semantic representations, instructions, and/or data values. The new or updated policy artifact is then stored in a suitable data structure, e.g. a searchable database, in persistent storage, such as the data storage 552.

In another embodiment of the computing system 500, the policy reasoner 518 is in communication with a natural language processor 520, which applies a policy ontology 524 to natural language policy or purpose input of a user to derive therefrom one or more policies, purposes, and/or anti-purposes to be implemented on the computing device 540 by the policy arbitration subsystem 550. That is, the policy arbitration subsystem 550 is extended by the policy reasoner 518 to facilitate policy generation by one or more stakeholders (e.g., the domain owners various organizations that apply for the end user). For example, in some embodiments, the policy reasoner 518 is embodied as (or as a component of) a "virtual personal assistant," which can engage a person in a natural language dialog to achieve the goal of developing a policy for the computing device 540 or a component thereof. Such a virtual personal assistant may be embodied as a computerized application that employs natural language processing (NLP) and/or natural language understanding (NLU) techniques to interpret natural language input (e.g., conversational input or dialog, including spoken natural language dialog) received by one or more user interface devices 526 (e.g., a microphone, keypad, etc.), and generate a machine-readable semantic representation of the user's intended meaning of the natural language input. The machine-readable semantic representation of the user's natural language policy or purpose statement may be stored as a policy artifact or set of policy artifacts 554, which may be embodied as machine-executable rules and/or computer program logic statements, for example.

Some aspects of virtual personal assistants, all or portions of which may be used in connection with or to implement one or more aspects of the policy reasoner 518, are described in at least the following patent applications of SRI International: Yadgar et al., U.S. patent application Ser. No. 13/314,965, filed Dec. 18, 2011, entitled "Generic Virtual Personal Assistant;" Nitz et al., U.S. patent application Ser. Nos. 13/585,003 and 13/585,008, filed Aug. 14, 2012, both entitled "Method, System, and Device for Inferring a Mobile User's Context and Proactively Providing Assistance;" and Kalns, et al., U.S. patent application Ser. Nos. 13/891,858 and 13/891,864, both filed May 10, 2013, both entitled, "Rapid Development of Virtual Personal Assistant Applications."

Briefly, the conversational (e.g., unstructured) natural language policy or purpose inputs are received and processed by, for example, a user intent interpreter module of the natural language processor 520 or the policy reasoner 518, which analyzes the input and formulates therefrom a likely intended goal or objective of the user with regard to establishing a purpose or policy for the computing device 540 or a component thereof (e.g., a domain 260, 270). Such a goal or objective may be referred to as a "user intent." In some embodiments, the user intent may be formulated as an intermediate structured representation of the conversational natural language input. For example, if the natural language policy statement includes the phrase, "Enterprise domain needs exclusive use of camera when I am on company property," the corresponding user intent may be formulated as, e.g., a combination of structured statements such as "DisableCamera (All_Other_Domains, Company_Location)." The policy reasoner 518 analyzes the natural language input and/or the user intent as needed, and based on its analysis, executes one or more "task flows" (e.g., machine-executable routines) to generate the policy artifacts 554. For example, the "Disable Camera (All_Other_Domains, Company_Location)" may be translated to a series of lower-level machine-executable instructions that can be executed by the policy arbitration subsystem 256 to assure that except for the enterprise domain, no other domain can use the camera when the computing device is located on company property. Furthermore, as the "Company_Location" could be defined as one or a combination of several different sensors (i.e. geo-fenced region, Wi-Fi AP SSID, NFC or BLUETOOTH trigger based on using device for site access), or user contextual operation (e.g., business functions performed on site, etc.), several compliant implementations can be formulated and included in the single policy artifact in case some devices have been restricted via other domain policies.

Where spoken natural language is used to input a policy or purpose statement, the user intent interpreter module analyzes the words and/or phrases produced by, e.g., an automated speech recognition (ASR) system, which, generally converts speech to the corresponding text (e.g., words and phrases). In this case, the user intent interpreter module may apply, for example, a rule-based parser and/or a statistical parser to determine, based on the verbal context, the likely intended meaning of spoken words or phrases that have multiple possible definitions (e.g., the user may have intended the word "net" to mean "Internet" or "subnet," or something else, depending on the context). An illustrative example of a natural language understanding component that may be used in connection with or as a part of the user intent interpreter module is the SRI Language Modeling Toolkit, available from SRI International. In some embodiments, the user intent interpreter module combines the likely intended meaning, goal, and/or objective derived from the natural language input as determined with any multi-modal inputs (e.g., GPS location, etc.) and the policy reasoner 518 synthesizes the combination of natural language inputs and other multi-modal inputs to generate the policy artifacts 554.

The policy ontology 524 is embodied as, for example, a database or knowledge base, which defines semantic relationships between various natural language terminology and their machine-readable counterparts. For example, the policy ontology 524 may define "corporate subnet" as referring to one or more specific internet protocol (IP) addresses associated with a company network, or may define "my house" as referring to a specific wireless access point, or may define "all social media" as a list of social media sites/services (e.g., FACEBOOK, TWITTER, LINKEDIN, TUMBLR, etc.). In this way, the policy ontology 524 facilitates not only policy creation but also policy maintenance, in that changes made to the ontology 524 can be automatically propagated to policy artifacts 554 that reference the ontology 524. Moreover, device-specific configuration details can be reflected in the ontology 524, thereby allowing just the ontology 524, and not the individual domain policies, to be updated in response to device, operating system, or software upgrades. Also, as mentioned earlier, the policy ontology 524 can reference to a set of options used to create policy artifacts and multiple implementations of compliant policies.

Domain & Policy Provisioning

Where multiple domains exist on a device, the policy arbitration subsystem 256, the policy manager 610, or more particularly the policy provisioning module 612, is charged with ensuring that domains 260, 270 can only be provisioned or executed on the device if their policies can function compliantly without invalidating the requirements (and thus social contract) of the policies of other provisioned domains. However, in some cases, the policy manager 610 may permit a domain to be provisioned on the device even if its policy has an unresolvable conflict with other existing domain policies but MPR requirements are still met. In other words, the domain may be provisioned, but not permitted to load or execute. As used herein, "provision" or "provisioning" may refer to, among other things, the process of installing and configuring a domain or component on a device in a way that it can be used in conformity with any applicable policies and/or purposes of the device (which may include the policies or purposes of other domains).

To perform its policy-mediating functions, the policy arbitration subsystem 256 maintains a global set of policy artifacts, which may be referred to herein as an active device policy 618 (FIG. 6). In some embodiments, the active device policy 618 comprises a least restrictive conforming policy global set of policy implementation, as described in more detail below. The active device policy 618 is dynamic in that at any given time, it reflects the set of policy rules that are currently active (e.g., actively being enforced) on the device 100. As described in more detail below, the policy arbitration subsystem 256 continuously updates the active device policy 618 as it receives domain triggered events 640 and event triggers 642 from the various domains 260, 270 or the trusted computing base (e.g., the shared services 218 or the virtualization service 212).

The policy artifacts 554, 800 may be embodied as computer readable instructions, directives, or statements that are submitted to the policy arbitration subsystem 256 from time to time by the provisioning system of the various domains 260, 270, independently of one another and typically without knowledge of the policies of the other domains 260, 270, to define permitted and unpermitted accesses and uses of one or more of the system resources 210 by one or more of the domains 260. As such, the policy artifacts 554, 800 may affect the ability of any of the domains 260, 270, including the domain that issued the artifact 554, 800, to access and use a system resource 210. However, the policy artifacts 554, 800 may be specifically designed to protect the interests of the particular domain that issued the artifacts 554, 800 and its associated assets (e.g., data that is stored on the device 100, 510 or accessible to the device 100, 510 via the artifact-issuing domain), without regard to the other domains. Thus, some of the policy artifacts 554, 800 may be implicated only when the issuing domain is running on the computing device 100, while others may be effective even if the issuing domain is not executing or active.

Figure 9:
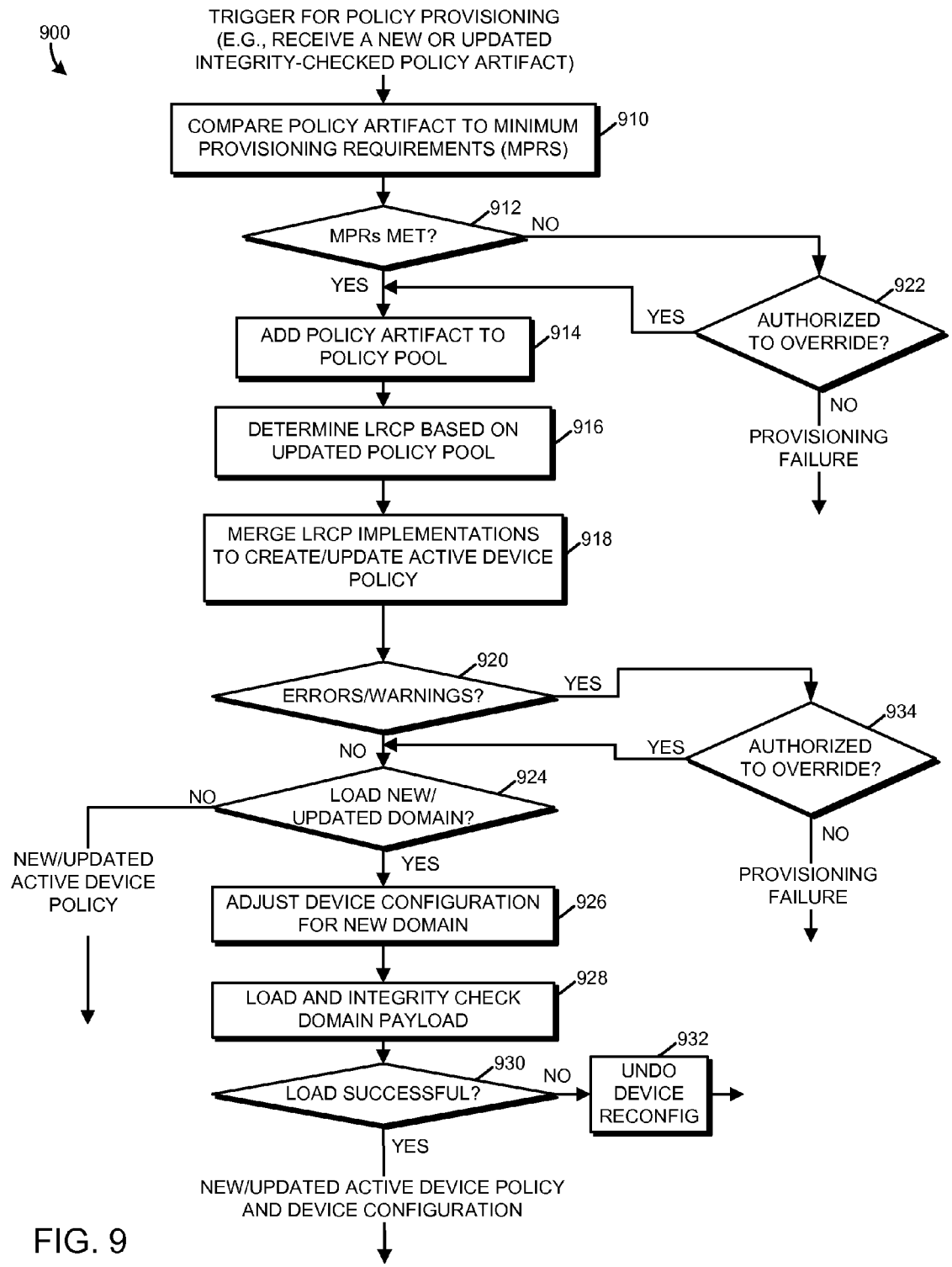
FIG. 9 is a simplified flow diagram of at least one embodiment of a method for policy provisioning of a computing device as disclosed herein.

Referring now to FIG. 9, an illustrative method 900 for performing policy provisioning is shown. The method 900 may be embodied as computerized programs, routines, logic and/or instructions executed by the computing device 100 or by the computing device 510 (by the policy provisioning module 612, for example). At block 910, the method 900 is initiated by the detection of an electronic communication comprising a request or trigger to start policy provisioning for a domain. For example, the method 900 may be initiated by the policy provisioning module 612 upon receipt of a new or updated ("candidate") policy artifact (which may have been integrity-checked) from a domain. At block 910, the device 100, 510 compares the new or updated policy artifact to the minimum provisioning requirements for the domain, described above. If the candidate policy artifact does not satisfy the minimum provisioning requirements, the device 100, 510 determines at block 922 whether the unsatisfied MPR can be overridden. If the unsatisfied MPR cannot be overridden, the domain provisioning fails and the method 900 ends. If the unsatisfied MPR is permitted to be overridden (e.g., flagged as optional or suggested), the method 900 proceeds to block 914.

At block 914, the MPR-approved candidate policy artifact is added to the policy pool 614. The update to the policy pool 614 triggers a re-determination of the least restrictive conforming policy, which occurs at block 916. An example of a method for making the LRCP determination is described in more detail below with reference to FIG. 10. Once the LRCP for all of the possible policy implementations 626, 628 in the policy pool 614 has been determined, they are merged to update the active device policy 618, at block 918. The algorithms performed at blocks 916, 918 are designed to result in the reconciling of the new or updated policy artifact with all of the other domain policies existing on the device, so that none of the policies violates the requirements (or social contract) of any of the other domain policies, with, in some cases, the exception of those flagged as optional by the domain owner and stakeholders.

At block 920, however, the device 100, 510 determines whether the merging of the LRCPs was successful; that is, whether the new or updated policy artifact can be reconciled with the policy artifacts in the existing active device policy 618, or whether the requirements of the new or updated policy artifact conflict with other aspects of the existing active device policy 618 in a way that cannot be resolved by, for example, adopting a different policy implementation 626, 628. If a conflict between the new or updated policy and the existing active device policy cannot be resolved in a manner that conforms to all of the domain policies, a notification is generated (e.g., an error or warning message). At block 934, the device 100, 510 determines whether the conflict can be overridden in a similar manner as described above. If the conflict cannot be overridden, the provisioning process ends unsuccessfully and the policy artifact is rejected. In some embodiments, rejection of the new or updated policy artifact may require that the requesting domain not be provisioned on the device. If the conflict can be overridden, the new or updated policy artifact is accepted into the active device policy 618, and if not already provisioned, the domain may be provisioned on the device. In some cases where a conflict is overridden, the domain may be provisioned but with restrictions that allow it to exist without conflicting with any of the other domain policies. For example, the domain may be permitted to load, initialize, or execute, but not as a background process (e.g., it can only be used "active") and only when other domains are not executing or active.

Referring to block 924, the device 100, 510 determines whether to load a new or updated domain on the device in accordance with the policy artifact as accepted by the device 100, 510. Such may be the case if the trigger for initiating domain provisioning is the receipt of a new or updated policy artifact for a domain (or version thereof) that does not already exist on the device. If only the policy artifact for the domain is updated and not the domain itself, the method 900 ends with the creation of the new or updated active device policy 618. If the domain issuing the policy artifact needs to be loaded or updated on the device, the method 900 adjusts the device configuration (e.g., a list of all domains provisioned on the device) to include the new or updated domain at block 926, and loads and integrity checks the domain payload (e.g., the operating system, applications, or other components of the domain) at block 928. Integrity checks as mentioned in the context of the method 900 may be performed by, for example, the integrity verification subsystem 252, described above. At block 930, the device 100, 510 determines whether the new or updated domain has been successfully loaded and if so, the method 900 ends with the generation of the new or updated active device policy 618 and the new or updated device configuration. If the new or updated domain is not successfully loaded, the device reconfiguration is reversed at block 932 (e.g., the domain and its associated policy artifact are removed from the device configuration and from the active device policy 618.

The LRCP engine 616 considers the available implementation options 626, 628 for each domain and develops the active device policy 618 by selecting implementation options for each domain that effectuate the purpose or policy of each domain without conflicting with the other domain purposes or policies. The event trigger handler 622 may, in some cases, re-engage the LRCP engine 616 from time to time to reconfigure the active device policy 618 as may be needed in response to event triggers 642 caused by changes in the policy pool 614 (e.g., provisioning, policy update, deprovisioning).

Figure 10:
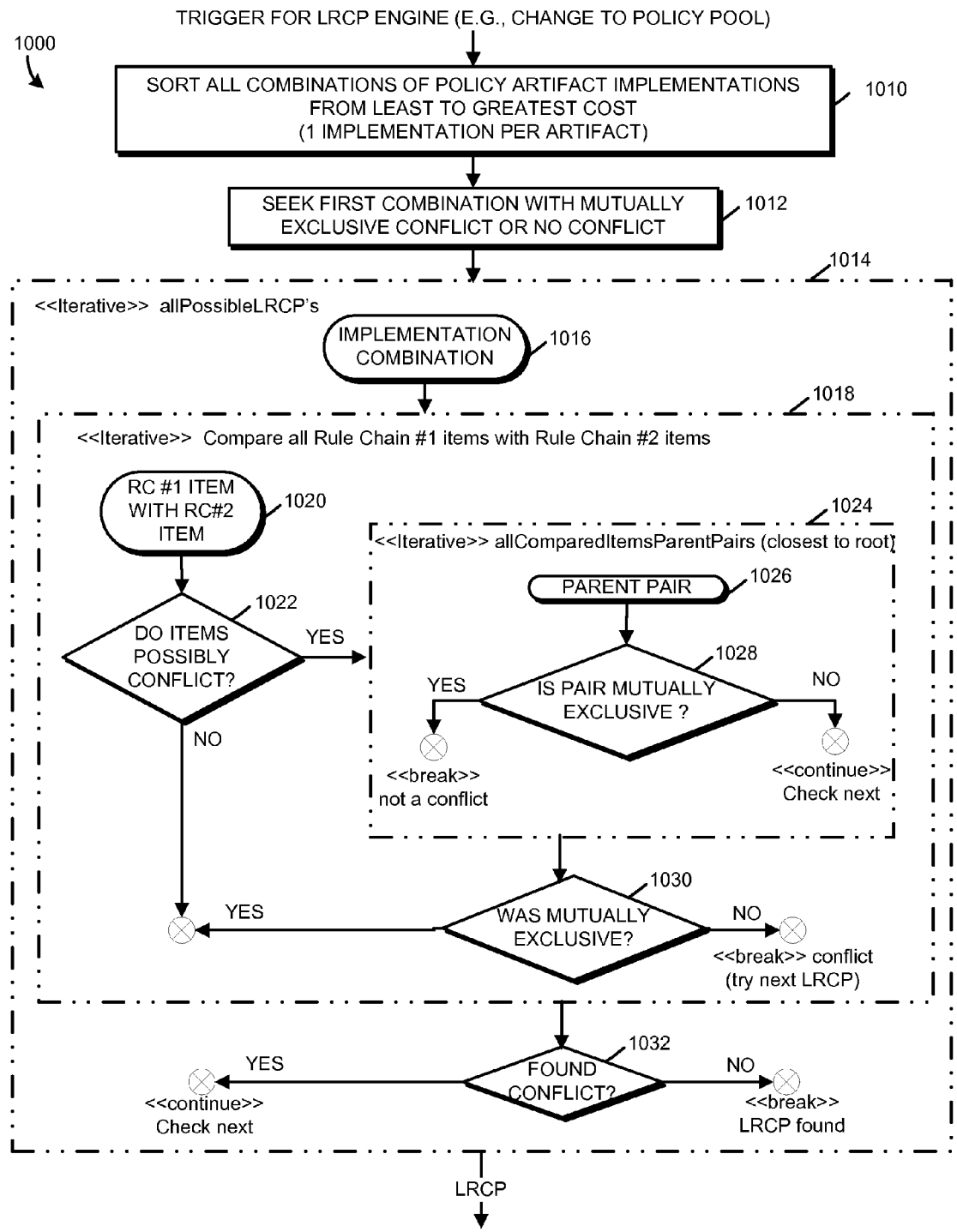
FIG. 10 is a simplified flow diagram of at least one embodiment of a method for determining a least restrictive conforming policy as disclosed herein.

Referring now to FIG. 10, an illustrative method 1000 for generating a least restrictive conforming policy is shown. The method 1000 may be embodied as computerized programs, routines, logic and/or instructions executed by the computing device 100 or by the computing device 510 (by the LRCP engine 616, for example). At block 1010, the method 1000 is initiated by an electronic communication such as a notification that the policy pool 614 has been updated with a new or updated policy artifact. The device 100, 510 begins by selecting the lowest cost implementation for each policy artifact and sorting all of the combinations of policy implementations (e.g., implementations 626, 628) from the set of policy artifacts from least to greatest cost. This enables the device 100, 510 to consider the lowest cost implementations first, and only consider higher cost implementations if an unresolvable conflict is found in the lower cost implementations. "Cost" as used herein, may refer to a measurable parameter that may be reflected in a data value that is assigned or associated with each implementation 626, 628. For example, a lower cost may indicate a less restrictive policy option and vice versa.

At block 1012, the device 100, 510 begins the process of iteratively seeking the first (e.g., lowest cost) combination of policy implementation options (e.g., "candidate" implementation options) that do not conflict or whose conflict is mutually exclusive. "Mutually exclusive" as used herein refers to policy conflicts that occur in different contexts and thus, are not true conflicts. For example, two domains may have policy rules that specify "when I am active, I have exclusive access to the microphone." Initially, these rules appear to conflict. However, further analysis of the rule chains may indicate that one of the domains can only be active when the other domain is not active. Thus, the conflict is mutually exclusive and the combination of the two policy implementation can be acceptable to both domains.

The iterative loops 1014, 1018, 1024 illustrate that each rule chain of each candidate implementation of each policy artifact of each domain is pairwise compared to determine whether a conflict exists, starting with the lowest level of each rule chain (blocks 1020, 1022). If no conflict is found at the lowest level of the rule chains being compared, the loop 1018 exits and the loop 1014 continues with examining the next rule chain combination in the current implementation combination. If the individual rule chain items being compared at block 1020 do potentially conflict, then the loop 1024 is initiated to backward-traverse the next-lowest level in each of the rule chains being compared (the parent pair 1026). If the comparison of the parent pair indicates that the lower-level pair conflict is mutually exclusive, the loop 1024 exits and the loop 1018 continues on with examining the next rule chain combination in the current implementation combination. If the comparison of the parent pair does not indicate mutual exclusivity, then the next lowest level parent pair is checked for mutual exclusivity. In the loop 1024, the rule chains are backward traversed until either mutual exclusivity is found or there is no higher level in the rule chains to compare. When the loop 1024 exits with a mutually exclusive determination, the loop 1018 moves on to the next comparison of the rule chain items for the current implementation combination. If the loop 1024 exits with a determination that an unresolvable conflict exists, the loop 1014 moves on to a comparison of the next implementation combination.

At block 1030, the device 100, 510 determines whether the current rule chain combination has a mutually exclusive conflict (or no conflict). If the rule chain combination has a conflict that is not mutually exclusive, the loop 1018 exits and the loop 1014 moves on to the next combination of implementation options. If the device 100, 510 determines at block 1032 that a mutually exclusive conflict exists between two candidate implementation options, then the method 1000 ends with the found LRCP as the combination of such candidate implementation options. The loop 1014 iterates through all of the available candidate implementation options until it either finds a combination of implementation options that has a mutually exclusive conflict or finds a combination of implementation options that has no conflict. If no such combination is found after all possible combinations have been examined, it is possible that the combination of domain policies may be unacceptable and need to be either rejected or accepted with revisions or acknowledgement of risk.

Policy Enforcement

As described in more detail below with reference to FIGS. 5-9, the illustrative policy arbitration subsystem 256 represents an executing instance of the policy arbitration subsystem 136, which, among other things, defines the protocols for, and in operation (256), regulates the electronic communications between the domains 260, 270 and the virtualization service 212. The policy arbitration subsystem 256, alone or in combination with one or more of the shared services 218, mediates these communications in accordance with security policies that may be specifically applicable to the individual domains 260, 270. Without requiring a priori component policies to be enforced cumulatively or additively at the global device level, the system is enabled to enforce each domain's "purpose" and deny the corresponding "anti-purpose." For example, the policy arbitration subsystem 256 may enforce a domain policy that requires information flow controls to prevent data from a highly secure domain from "leaking" over into another less-secure domain without proper encryption or other filtering (e.g., to prevent private or confidential data from being sent off of the computing device 100 through e-mail or other services without VPN—Virtual Private Network), and a domain policy to prevent multiple domains 260, 270 from using a system resource 210 at the same time. For instance, rather than "summing" all of the domain policies to create a monolithic device policy, the policy arbitration subsystem 256 can enforce only the portions of each policy needing to be compliant according to the current operating context of the device.

As another example, the policy arbitration subsystem 256 may restrict access to particular hardware components by specific domains 260, 270 to deny an "anti-purpose" of the system. In particular, access by a domain 260, 270 to device drivers that control hardware components that are capable of capturing personal or confidential information (like the camera, phone, GPS, and microphone) may be selectively restricted. In other words, the policy arbitration subsystem 256 may not only prevent data from leaking from highly secure to less secure domains, but can also effectively control access to specific system resources based on a security policy or in response to "real-time" information, such as the current geographic location of the computing device 100, the current time of day, and/or other aspects of the current context of the computing device 100 that may be detected, for example, by sensors 152. For instance, the policy arbitration subsystem 256 may enforce a domain-specific access policy that governs the use of a system resource or the transfer of data/content from one domain 260, 270 to another domain 260, 270 based on the time of day, location, or based on a current context captured as a state of the computing device 100.

A component of the policy arbitration subsystem 256 includes the detection of event triggered actions which may have originated from, but are not limited to, a user interaction (i.e. buttons, touchscreen), an environmental change (i.e. sensor change such as location or proximity, network availability or connection), changes in hardware (i.e. enabling or disabling of hardware components, battery state, physics-based policy), or system operation (i.e. provisioning, policy updates). In some cases, policy actions need to be enacted in order to control (i.e. deny, filter, and downgrade) similar items as those detected via triggers. Both of these functions may be provided via trusted components of the platform on device 100. As previously mentioned, in some embodiments, the communication channels between the policy arbitrator 620 and these trusted components are well-defined and not able to be spoofed or otherwise prevented or modified via an untrusted component. In some embodiments, these tasks can be performed by the virtual service providers 224, 230, 236, 242 of those functions. Other embodiments may use components inline between the main virtual service provider 224, 230, 236, 242 and connected virtual service enabler 262, 272. To minimize the specialized, per-service logic required by the policy arbitrator 256, some embodiments utilize these trusted components to perform the comparison of actions and triggers with others in order to detect conflicts and mutually exclusive scoping, as discussed in more detail below with reference to the LRCP engine algorithm.

In cases where the active device policy 618 is implicated by a domain triggered event 640 or an event trigger 642, the policy arbitrator 620 determines an appropriate policy action as specified in the implementation include in the policy artifacts 554. The policy arbitrator 620 communicates policy actions 650 to the affected domains 260, 270 and communicates policy actions 660 to the affected shared services 218. The policy actions 650, 660 generally include messages or instructions that can be interpreted by the recipient (e.g., the domains 260, 270 or the shared services 218) and executed (e.g., by the trusted computing base) in order to control one or more of the system resources 210 to effectuate the policy or policies implicated by the event 630, 640. In some cases, policy actions 650, 660 may be embodied as electronic communications between the virtual service providers 224, 230, 236, 242 and/or the virtual service enablers 262, 272.

Figure 11:
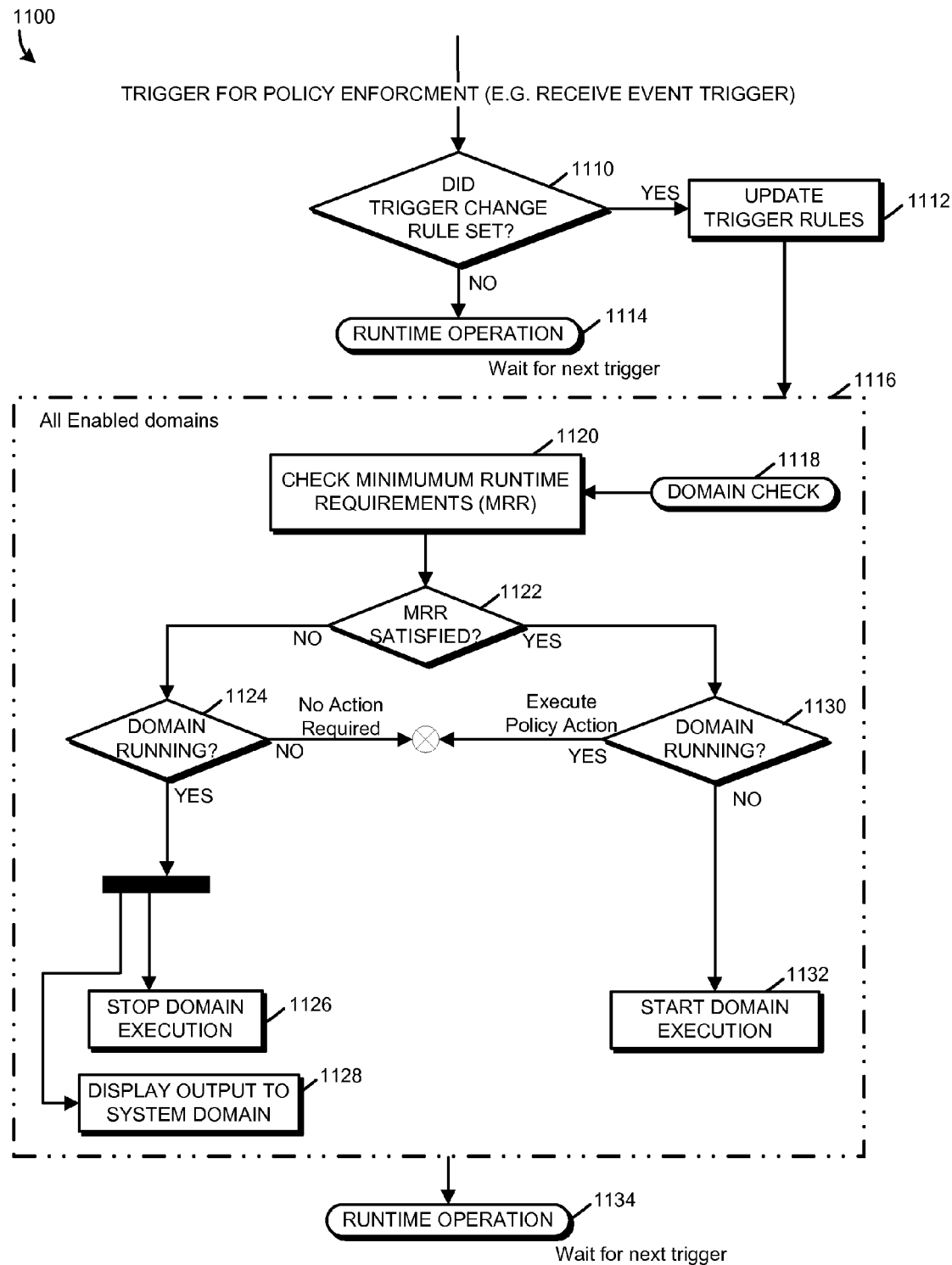
FIG. 11 is a simplified flow diagram of at least one embodiment of a method for handling an event trigger as disclosed herein.

Referring now to FIG. 11, an illustrative method 1100 for enforcing a policy in response to an event (e.g., a domain triggered event 640 or an event trigger 642) is shown. The method 1100 may be embodied as computerized programs, routines, logic and/or instructions executed by the computing device 100 or by the computing device 510 (by the policy arbitrator 620 and/or the event trigger handler 622, for example). At block 1110, the method 1100 is initiated by an electronic communication indicating a request or trigger for policy enforcement, such as a domain triggered event 640 or an event trigger 642. At block 1110, the device 100, 510 determines whether the trigger causes a change to the current trigger rule set, e.g., the trigger matches the head of an active rule chain. If the trigger changes the current trigger rule set, the device 100, 510 updates the current set of trigger rules accordingly at block 1112 and then initiates the loop 1116, which iterates for all of the domains that are enabled on the device, to determine whether operation of any of the domains is affected by the triggered action(s) completed by the policy enforcement. If the trigger does not change the current trigger rule set, the device 100, 514 continues with normal runtime operation at block 1114. In the loop 1116, each domain is checked beginning at block 1118. At block 1120, a determination is made as to whether the domain's minimum runtime requirements are still satisfied in light of the occurrence of the triggered action(s). If the domain's MRRs are not satisfied, the device 100, 510 determines whether the domain is currently actively running, at block 1124. If the domain is not currently running, no action is required with respect to that domain, and the loop 1116 proceeds to evaluate the next domain. If the domain is currently running, the device 100, 510 stops execution of the domain at block 1126 and displays output to the system domain (or user interface to a limited set of the devices core functions including hardware and software state) to indicate that the domain's MRRs are no longer satisfied, at block 1128. Among other reasons, this can occur due to a required resource being restricted, a domain being disabled, or another system event. If at block 1122 the device 100, 510 determines that the domain's MRRs are satisfied in light of the triggered action(s), the device 100, 510 similarly determines whether the domain is currently actively running on the device, at block 1130. If the domain is currently running, the device 100, 510 performs no action, and the loop 1116 moves on to evaluate the effect of the triggered action(s), if any, on the next domain. If the domain is not currently running, the device 100, 510 may begin executing the domain in that its MRRs are satisfied, at block 1132, and the loop 1116 continues on to evaluate the effect of the trigger, if any, on the next domain. This particular event can happen when a domain is marked as enabled, as such event may act as a trigger in the platform's policy. When all of the enabled domains on the device have been evaluated as described above, the device 100, 510 continues runtime operation until the next trigger, at block 1134.

Example Usage Scenarios

Embodiments of the above-described policy management techniques can provide dynamic, finer-grained policy control that has many potential applications. For example, some embodiments of the policy arbitration subsystem 136, 256 can be used to supplement and extend existing static mobile device policies that are managed by mobile device management services and other third parties to a virtualized, multiple-personality mobile computing platform or mobile virtual appliance.

In one example, a device 100 includes integrated phone and microphone features. Also, the exemplary device 100 has two domains: a personal domain and an enterprise domain. The personal domain has a domain policy that specifies that the enterprise domain is not permitted to listen in on telephone calls that the user receives when the calls are taken by the user with the device 100 in the personal domain. In the illustrated example, a phone call arrives and the user answers the call in the personal domain. The answering of the call acts as an event trigger. The policy arbitration subsystem receives the event trigger over a well-defined communication channel as described above. The policy arbitration subsystem analyzes the active device policy, and issues a policy action in the form of a disable microphone instruction for the enterprise domain. The policy arbitration subsystem sends the disable microphone instruction to the microphone virtual service provider. The microphone virtual service provider executes the command to disable the microphone only for the enterprise domain. As a result, the user of the device 100 is permitted to talk securely on the microphone in the personal domain without fear that the enterprise domain may also have access to the conversation. When the user ends the personal phone call, the policy arbitration subsystem issues a policy action to the microphone virtual service provider to re-enable the use of the microphone by the enterprise domain. In this way, the static policy of "don't allow the enterprise to listen to my personal calls" is flexibly implemented by the policy arbitration subsystem.

In another example, the device 100 is again provisioned with a personal domain and an enterprise domain. Here, the enterprise domain has a local policy that prohibits the user of the device 100 from accessing certain intranet internet protocol (IP) addresses when they are on company property and are not using the enterprise domain. The device 100 has wireless internet (e.g. WIFI) capabilities that allow it to automatically monitor for the presence of WIFI access points in the immediate geographic area. The domain-local policy requires that intranet subnet access is restricted to only the enterprise domain when the device 100 is connected to the company's WIFI access point. Further, the enterprise policy prohibits the employee from recording video, pictures, or audio of proprietary information while on company property. In this case, the event trigger handler of the policy arbitration subsystem detects that the device 100 has connected to the company's wireless access point. In response, the event trigger handler sends policy actions to the virtual service providers controlling the camera, microphone, and intranet access. In this example, a policy action restricts only the personal domain (intranet access) while another policy action restricts all domains (camera and microphone) in response to the trigger event of the user having arrived on company property.

Once the user of the device 100 leaves the company property, the event trigger handler will no longer detect a connection to the corporate wireless access point. In response, the policy arbitration subsystem verifies that no other existing policy artifacts in the active device policy require the restrictions that were required by policy action, and then issues policy actions to the virtual service providers controlling the intranet access, camera, and microphone features of the device 100. In this way, the policy arbitration subsystem selectively controls access to the system resources by multiple different domains.

Suppose that the domain owner in the previous example wants to further ensure no phones are allowed onto the corporate property unless it is assured that the company's policy is enacted on the device (via the enterprise domain). When an employee arrives at work, the device automatically connects to the corporate access point, performs the policy restrictions (i.e. camera and microphone), makes the enterprise domain active (foreground), and for the user to approach the security checkpoint. At this point, the security checkpoint initiates a prompt-response query (via the WIFI connection to the enterprise domain) and a random color, text, or other response is shown to confirm connectivity and the appropriate policies are being enforced. To ensure the user does not deprovision the enterprise domain (and thus policy), some implementations may prevent deprovisioning while on corporate grounds, require GPS access so that the deprovisioning can be reported against the user with their user coordinates via WIFI, or other protective measures. Of course, when the user is away from the corporate grounds, these restrictions are not required and thus are not enforced, thus allowing normal use of the user device 100.

The suite of tools disclosed herein extends to a number of embodiments, platforms, and devices. In this example, the device being shared is a corporate cloud service which may include a server farm, end-user computers, and mobile devices. In this system, domains are created to both host isolated services (based on project, job, other task specific) as well as provide remote connectivity to said services. All of the domains are stored in a private "domain store" hosted on a secure server at the company's facility that provided secure connectivity to the various devices for deployment. Each of these domains include their own policy artifact with accompanying multiple implementations, which protect the company's interests. Furthermore, each policy artifact was created via the summation of all stakeholders' (i.e. company, department, project) requirements as defined to protect their interests. In addition to the previously discussed policy requirements (i.e. subnet access and restriction), requirements for performance (i.e. CPU speed, memory, network speed), data security (i.e. site security, data encryption, storage on physically self-destructive drives), and system cohabitation restrictions (i.e. only domains with a key-based shared resources can also be on the device). These extra restrictions, in addition to the authentication requiring deployment systems, allow domain creators to not have to manually load each device and user but rather to utilize the policy suite and accompanying policy to control the deployment. For example, a mobile device could be allowed to provision a highly sensitive piece of information (assuming it met the MPRs), as the company has an assurance that the data is sufficiently protected (e.g., the storage could be physically destroyed should the password be mis-entered multiple times or the network command to delete ("wipe") is issued.) This also eases the software management burden in the server farm as the virtualization service can automatically load balance the services based on their performance requirements. Furthermore, high security elements could coexist in the cloud but be limited to highly physically secured servers. By enabling per-domain policy creation, the domain creators, rather than the corporate device managers, can define the security requirements for deployment.

The policy arbitration subsystem disclosed herein is by no means limited to benefitting only mobile device applications. For instance, embodiments of the policy arbitration subsystem can be integrated into virtualized personal computer or server farm operating systems (e.g., cloud-based computing services).

Additional Examples

In accordance with at least one aspect of this disclosure, a computing device includes one or more processors; and one or more machine accessible storage media having embodied therein a policy arbitration system and a plurality of independently executable domains executable by the one or more processors, wherein the policy arbitration system is executable to manage access to one or more shared system resources by the plurality of domains; each of the domains has a domain-specific policy that is unknown to the other domains; and the policy arbitration system is executable to determine and enforce a least-restrictive combination of the domain-specific policies that enables the plurality of domains to execute on the computing device without violating the domain-specific policies of any of the domains.

The policy arbitration system may be executable independently of any operating system of the computing device and independently of the plurality of domains. The policy arbitration system may be executable to determine and enforce the least-restrictive combination of the domain-specific policies dynamically in response to an event trigger. Each of the domain specific policies may be defined to include a purpose and an anti-purpose, where the purpose defines a desired activity of the computing device, and the anti-purpose defines an undesired activity of the computing device relating to the purpose. Each of the plurality of domains may be memory-isolated from the other domains and from the policy arbitration system. The one or more machine accessible storage media may include a trusted protected memory and the policy arbitration system may reside in the trusted protected memory. The computing device may include a mobile device having a virtualized system architecture enabling the policy arbitration system. The plurality of domains may communicate with the policy arbitration system and with the one or more shared system resources only through well-defined, secure communication channels.

In accordance with at least one aspect of this disclosure, a method for controlling access to one or more shared system resources of a computing device by a plurality of peer domains each having a defined purpose that is unknown to the other domains, where each of the domains is executable independently of the other domains and to request access to the one or more shared system resources, includes, with the computing device, maintaining, independently of the domains, a set of domain-specific policies governing operation of the computing device, where the set of domain-specific policies includes, for each of the domains, at least one policy implementation that effectuates the defined purpose of the domain without conflicting with the defined purpose of any of the other domains on the computing device; and in response to an event trigger, executing at least one of the policy implementations implicated by the event trigger.

The method may include, for each of the domains, selecting a least restrictive policy implementation from a plurality of candidate policy implementations, wherein the least restrictive policy implementation effectuates the defined purpose of the domain in a least restrictive way without conflicting with the defined purpose of any of the other domains on the computing device, and executing the selected policy implementation in response to the event trigger. The method may include associating a value with each of the candidate policy implementations and determining the least restrictive policy implementation based on the value. The method may include generating the set of domain-specific policies from one or more conversational natural language statements of the defined purpose for each of the domains. The method may include, for each domain, creating a policy artifact, wherein the policy artifact comprises a machine-readable semantic representation of the one or more conversational natural language statements of the defined purpose of the domain. The method may include comparing the policy artifact of each domain to the policy artifact of each of the other domains and determining if any of the policy artifacts conflict. In the method, for each domain, the policy artifact may include a set of candidate policy implementations, where each of the candidate policy implementations effectuates the purpose of the domain in a different manner. The method may include associating an event trigger with each of the candidate policy implementations. In the method, each of the candidate policy implementations may specify an action to be taken by the computing device with regard to one or more of the shared system resources in response to the associated trigger event.

In accordance with at least one aspect of this disclosure, a policy arbitration system for a computing device includes a plurality of instructions embodied in one or more computer accessible storage media and executable by one or more processors to analyze a set of candidate policy implementations, where each of the candidate policy implementations is executable to effectuate a defined purpose of the computing device in a different manner, and where the defined purpose specifies a permitted use of one or more shared system resources of the computing device; select, from the set of candidate policy implementations, a least restrictive candidate policy implementation that does not conflict with at least one other defined purpose of the computing device; and enforce the selected policy implementation to control access to the one or more shared system resources of the computing device if the policy implementation is implicated by an event trigger.

In the policy arbitration subsystem, if the computing device includes a plurality of domains that are independently executable on the computing device to request access to one or more of the shared system resources, each of the candidate policy implementations may be associated with one of the domains, and each of the candidate policy implementations may be executable to effectuate a defined purpose of its respective domain. The plurality of instructions may be executable to, for each of the domains, select a least restrictive policy implementation that does not conflict with any of the defined purposes of the domains, and compile the selected policy implementations into a set of policies to govern the operation of the computing device across all of the domains. The computing device may include a first domain and a second domain each executable independently of the other and to request access to one or more shared system resources of the computing device, and the plurality of instructions may be executable to compare candidate policy implementations of the first and second domains and determine a least restrictive combination of the candidate policy implementations of the first domain and the second domain to enforce on the computing device. Each of the candidate policy implementations may include one or more rule chains each comprising one or more rules associated with an event trigger, and the plurality of instructions may be executable to backward-traverse the rule chains to determine if a conflict exists between the compared candidate policy implementations. The plurality of instructions may be executable to select the least restrictive combination of policy implementations from a plurality of candidate combinations of policy implementations. The plurality of instructions may be executable to determine a value associated with each of the candidate combinations of policy implementations and select the least restrictive combination of policy implementations based on the determined value. The policy arbitration system may be embodied as one or more extensions to an Application Programming Interface (API). The policy arbitration system may be embodied as a trusted component of a mobile computing device having a virtualized system architecture. A computing device may be arranged according to a Multiple Independent Levels of Security (MILS) architecture and may include any of the foregoing policy arbitration systems.

General Considerations

In the foregoing description, numerous specific details, examples, and scenarios are set forth in order to provide a more thorough understanding of the present disclosure. It will be appreciated, however, that embodiments of the disclosure may be practiced without such specific details. Further, such examples and scenarios are provided for illustration, and are not intended to limit the disclosure in any way. Those of ordinary skill in the art, with the included descriptions, should be able to implement appropriate functionality without undue experimentation.

References in the specification to "an embodiment," etc., indicate that the embodiment described may include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to effect such feature, structure, or characteristic in connection with other embodiments whether or not explicitly indicated.

Embodiments in accordance with the disclosure may be implemented in hardware, firmware, software, or any combination thereof. Embodiments may also be implemented as instructions stored using one or more machine-readable media, which may be read and executed by one or more processors. A machine-readable medium may include any mechanism for storing or transmitting information in a form readable by a machine (e.g., a computing device or a "virtual machine" running on one or more computing devices). For example, a machine-readable medium may include any suitable form of volatile or non-volatile memory.

Modules, data structures, and the like defined herein are defined as such for ease of discussion, and are not intended to imply that any specific implementation details are required. For example, any of the described modules and/or data structures may be combined or divided into sub-modules, sub-processes or other units of computer code or data as may be required by a particular design or implementation.

In the drawings, specific arrangements or orderings of schematic elements may be shown for ease of description. However, the specific ordering or arrangement of such elements is not meant to imply that a particular order or sequence of processing, or separation of processes, is required in all embodiments. In general, schematic elements used to represent instruction blocks or modules may be implemented using any suitable form of machine-readable instruction, and each such instruction may be implemented using any suitable programming language, library, application-programming interface (API), and/or other software development tools or frameworks. Similarly, schematic elements used to represent data or information may be implemented using any suitable electronic arrangement or data structure. Further, some connections, relationships or associations between elements may be simplified or not shown in the drawings so as not to obscure the disclosure.

This disclosure is to be considered as exemplary and not restrictive in character, and all changes and modifications that come within the spirit of the disclosure are desired to be protected.

The invention claimed is:

1. A computing device for use with multiple user-level execution environments wherein the environments are isolated from one another to simultaneously protect personal privacy and enterprise security while enabling data sharing, the computing device comprising:
   one or more hardware processors; and
   one or more machine accessible storage media having embodied therein a policy arbitration system and a plurality of independently executable domains executable by the one or more processors, wherein:
   the policy arbitration system is executable to manage access to one or more shared system resources by the plurality of independently executable domains;
   each of the plurality of independently executable domains having domain-specific policies including use purpose contexts that are unknown to the other independently executable domains, wherein the use purpose contexts are indicative of a personal or non-personal use, wherein a personal use context pertains to at least one domain in which there is a higher need to share information than a domain having a non-personal use context, and wherein the non-personal use context pertains to at least one domain in which there is a higher need to protect information than a domain having the personal use context domain; and
   the policy arbitration system is executable to determine and enforce, autonomously, dynamically in response to an event trigger, a least restrictive combination of the domain-specific policies that enables the plurality of independently executable domains to execute on the computing device for a use purpose context of one of the independently executable domains without violating the domain-specific policies of any other ones of the plurality of independently executable domains,
   wherein the determination of the least restrictive combination of domain-specific policies includes analyzing candidate policy implementations associated with the plurality of domains and executable to effectuate defined purposes of the domains, wherein the defined purpose specifies the permitted use purpose context of one or more shared system resources of the computing device, and selecting a least restrictive candidate policy implementation that does not conflict with any of the defined purposes of the domains.

2. The computing device of claim 1, wherein the policy arbitration system is executable independently of any operating system of the computing device and independently of the plurality of domains.

3. The computing device of claim 1, wherein each of the domain specific policies includes a defined purpose and an anti-purpose, wherein the purpose identifies a desired functionality of the computing device for a domain of the plurality of independently executable domains, and the anti-purpose defines an undesired functionality of the computing device resulting from the functionality of the purpose.

4. The computing device of claim 1, wherein each of the plurality of domains is memory-isolated from the other domains and from the policy arbitration system.

5. The computing device of claim 1, wherein the one or more machine accessible storage media comprises a trusted protected memory and the policy arbitration system resides in the trusted protected memory.

6. The computing device of claim 1, wherein the computing device comprises a mobile device having a virtualized system architecture enabling the policy arbitration system.

7. The computing device of claim 1, wherein the plurality of domains communicate with the policy arbitration system and with the one or more shared system resources only through well-defined, secure communication channels.

8. A method for controlling access to one or more shared system resources of a computing device by a plurality of peer domains each having a defined use purpose context that is unknown to the other domains, each of the domains executable independently of the other domains and to request access to the one or more shared system resources, the method comprising, with the computing device:
   maintaining, independently of the domains, a set of domain-specific policies governing operation of the computing device, the set of domain-specific policies comprising, for each of the domains, at least one policy implementation that effectuates the defined use context purpose of the domain without conflicting with the defined use purpose context of any of the other domains on the computing device;
   in autonomous response to an event trigger, executing at least one of the policy implementations implicated by the event trigger, wherein the use purpose context is indicative of a personal or non-personal use, wherein a personal use context pertains to at least one domain in which there is a higher need to share information than a domain having a non-personal use context, and wherein the non-personal use context pertains to at least one domain in which there is a higher need to protect information than a domain having the personal use context domain; and
   for each of the domains, selecting a least restrictive policy implementation from a plurality of candidate policy implementations, wherein the least restrictive policy implementation effectuates the defined purpose of the domain in a least restrictive way without conflicting with the defined purpose of any of the other domains on the computing device, and executing the selected policy implementation in response to the event trigger,
   wherein a policy arbitration system is executable to determine and enforce the least-restrictive combination of the domain-specific policies dynamically in response to an event trigger.

9. The method of claim 8, comprising associating a value with each of the candidate policy implementations and determining the least restrictive policy implementation based on the value.

10. The method of claim 8, comprising generating the set of domain-specific policies from one or more conversational natural language statements of the defined purpose for each of the domains.

11. The method of claim 10, comprising, for each domain, creating a policy artifact, wherein the policy artifact comprises a machine-readable semantic representation of the one or more conversational natural language statements of the defined purpose of the domain.

12. The method of claim 11, comprising comparing the policy artifact of each domain to the policy artifact of each of the other domains and determining if any of the policy artifacts conflict.

13. The method of claim 11, wherein, for each domain, the policy artifact comprises a set of candidate policy implementations, wherein each of the candidate policy implementations effectuates the purpose of the domain in a different manner.

14. The method of claim 13, comprising associating an event trigger with each of the candidate policy implementations.

15. The method of claim 14, wherein each of the candidate policy implementations specifies an action to be taken by the computing device with regard to one or more of the shared system resources in response to the associated trigger event.

16. A policy arbitration system for a computing device for use with multiple user-level execution environments wherein the environments are isolated from one another to simultaneously protect personal privacy and enterprise security while enabling data sharing, wherein the computing device is configured with a plurality of domains that are independently executable on the computing device to request access to one or more shared system resources of the computing device, the policy arbitration system comprising:
one or more processors; and
a non-transitory computer-readable medium comprising a plurality of instructions executable by one or more processors to:
analyze a set of candidate policy implementations, each of the candidate policy implementations being associated with one of the plurality of domains and executable to effectuate a defined purpose of the associated domain, the defined purpose specifying a permitted use purpose context of one or more shared system resources of the computing device;
select, from the set of candidate policy implementations, a least restrictive candidate policy implementation that does not conflict with any of the defined purposes of the domains; and
compile and autonomously enforce the selected policy implementation to govern the operation of the computing device across all of the domains, including to control access to the one or more shared system resources of the computing device if the policy implementation is implicated by an event trigger;
wherein the use purpose context is indicative of a personal or non-personal use, wherein a personal use context pertains to at least one unclassified domain a non-personal use context pertains to at least one classified domain.

17. The policy arbitration system of claim 16, wherein the computing device comprises a first domain and a second domain of the plurality of domains, wherein each of the first and second domain are executable independently of the other and each are to request access to one or more shared system resources of the computing device, and the plurality of instructions are executable to compare candidate policy implementations of the first and second domains and determine a least restrictive combination of the candidate policy implementations of the first domain and the second domain to enforce on the computing device.

18. The policy arbitration system of claim 16, wherein each of the candidate policy implementations comprises one or more rule chains each comprising one or more rules associated with the event trigger, and the plurality of instructions are executable to backward traverse the rule chains to determine if a conflict exists between the compared candidate policy implementations.

19. The policy arbitration system of claim 16, wherein the plurality of instructions are executable to determine a value associated with each of the candidate combinations of policy implementations and select the least restrictive combination of policy implementations based on the determined value.

20. The policy arbitration system of claim 16, wherein the policy arbitration system is embodied as one or more extensions to an Application Programming Interface (API).

21. The policy arbitration system of claim 16, wherein the policy arbitration system is embodied as a trusted component of a mobile computing device having a virtualized system architecture.

* * * * *